US012675682B2

(12) United States Patent
Sawada et al.

(10) Patent No.: US 12,675,682 B2
(45) Date of Patent: Jul. 7, 2026

(54) NEURAL NETWORK ACCELERATOR OUTPUT RANKING

(71) Applicant: INTERNATIONAL BUSINESS MACHINES CORPORATION, Armonk, NY (US)

(72) Inventors: Jun Sawada, Austin, TX (US); Rathinakumar Appuswamy, San Jose, CA (US); John Vernon Arthur, San Jose, CA (US); Andrew Stephen Cassidy, Austin, TX (US); Pallab Datta, San Jose, CA (US); Michael Vincent DeBole, Poughkeepsie, NY (US); Steven Kyle Esser, San Jose, CA (US); Dharmendra S. Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1046 days.

(21) Appl. No.: 17/078,712

(22) Filed: Oct. 23, 2020

(65) Prior Publication Data
US 2022/0129743 A1 Apr. 28, 2022

(51) Int. Cl.
*G06N 3/08* (2023.01)
*G06F 7/06* (2006.01)
*G06F 16/22* (2019.01)

(52) U.S. Cl.
CPC ................ *G06N 3/08* (2013.01); *G06F 7/06* (2013.01); *G06F 16/2246* (2019.01)

(58) Field of Classification Search
CPC .......... G06F 16/2246; G06F 7/06; G06N 3/08
See application file for complete search history.

(56) References Cited

U.S. PATENT DOCUMENTS 6,330,559 B1 * 12/2001 Azuma ..................... G06F 7/36
10,135,463 B1 * 11/2018 Satpathy ............. H03M 7/6023
(Continued)

FOREIGN PATENT DOCUMENTS

WO        2016070096 A1      5/2016

OTHER PUBLICATIONS

Mou et al. "Convolutional Neural Networks over Tree Structures for Programming Language Processing," Feb. 21, 2016, Proceedings of the Thirtieth AAAI Conference on Artificial Intelligence (AAAI-16), pp. 1287-0293. (Year: 2016).*
(Continued)

*Primary Examiner* — Kyle R Stork
(74) *Attorney, Agent, or Firm* — Amin, Turocy & Watson, LLP

(57) ABSTRACT

Neural network accelerator output ranking is provided. In various embodiments, a system comprises a data memory; a memory controller configured to access the data memory; a plurality of comparators configured in a tree; a register; and a two-way comparator. The memory controller is configured to provide a first plurality of values from the data memory to the comparator tree. The comparator tree is configured to perform a plurality of concurrent pairwise comparisons of the first plurality of values to arrive at a first greatest value of the first plurality of values. The two-way comparator is configured to output the greater of the greatest value from the comparator tree and a stored value from the register. The register is configured to store the output of the two-way comparator.

20 Claims, 24 Drawing Sheets

(56) References Cited

U.S. PATENT DOCUMENTS

| | | | |
|---|---|---|---|
| 2008/0114736 | A1 | 5/2008 | Frank et al. |
| 2010/0235674 | A1* | 9/2010 | Song ........................ G06F 7/32 |
| | | | 718/100 |
| 2016/0188644 | A1* | 6/2016 | Sukhwani ......... G06F 16/24558 |
| | | | 707/753 |
| 2016/0379115 | A1 | 12/2016 | Burger et al. |
| 2017/0193037 | A1 | 7/2017 | Bhagwan et al. |
| 2018/0174026 | A1* | 6/2018 | Davies ................... G06N 3/063 |
| 2018/0350351 | A1 | 12/2018 | Kopys et al. |
| 2019/0042909 | A1* | 2/2019 | Sumbul .................... G06N 3/08 |
| 2019/0325295 | A1 | 10/2019 | Modha et al. |
| 2020/0311041 | A1* | 10/2020 | Surti ................... G06F 16/9027 |
| 2020/0387472 | A1* | 12/2020 | Ramesh .............. G06F 9/30014 |

OTHER PUBLICATIONS

Painkras et al. "SpiNNaker: A Multi-Core System-on-Chip for Massively-Parallel Neural Network Simulation, " 2012, IEEE, pp. 1-4. ( Year: 2012).*

Severyn et al., "Learning to Rank Short Text Pairs with Convolutional Deep Neural Networks," ACM, http://citeseerx.ist.psu.edu/viewdoc/download?doi=10.1.1.723.6492&rep=rep1&type=pdf (2015).

* cited by examiner

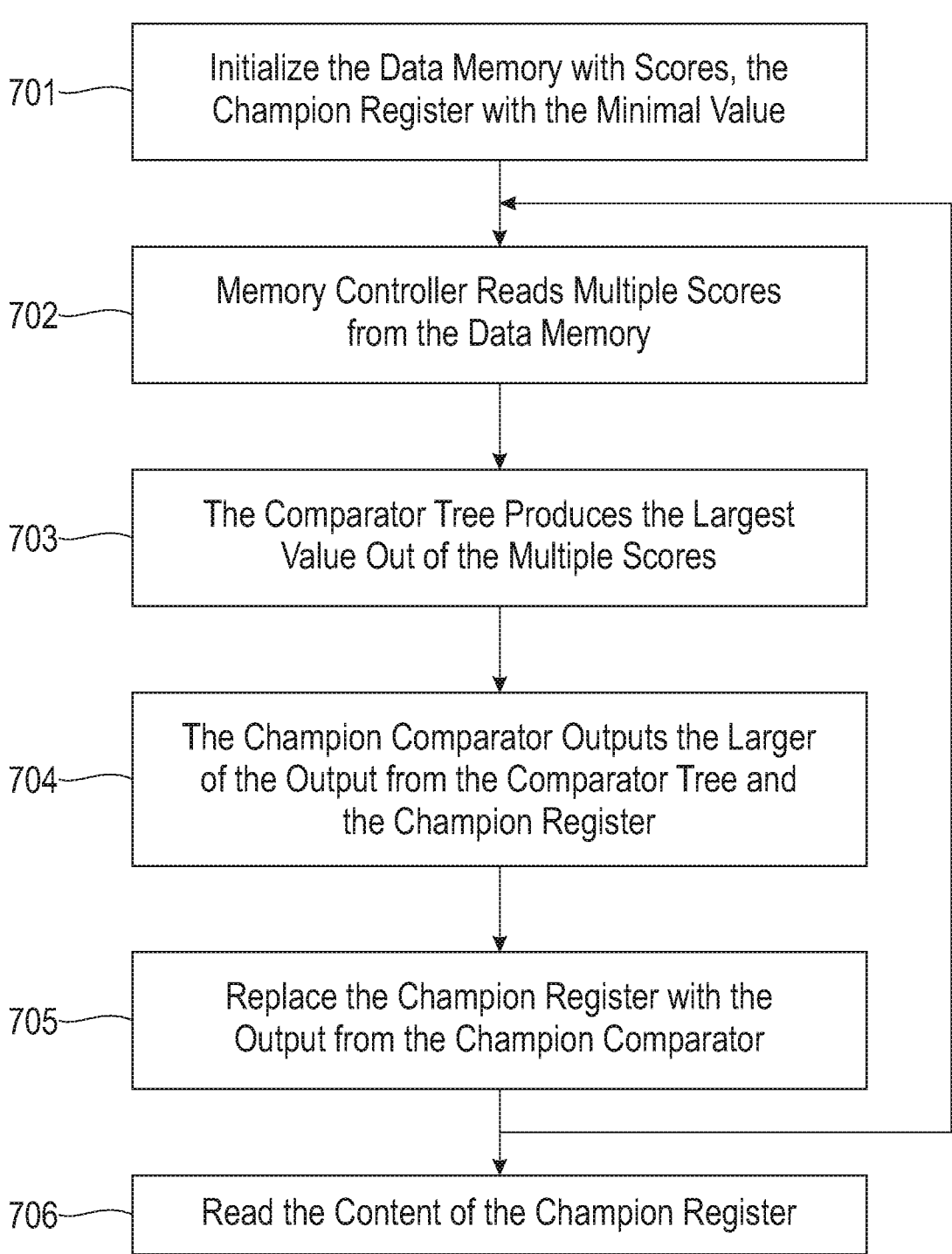

701 — Initialize the Data Memory with Scores, the Champion Register with the Minimal Value 702 — Memory Controller Reads Multiple Scores from the Data Memory 703 — The Comparator Tree Produces the Largest Value Out of the Multiple Scores 704 — The Champion Comparator Outputs the Larger of the Output from the Comparator Tree and the Champion Register 705 — Replace the Champion Register with the Output from the Champion Comparator 706 — Read the Content of the Champion Register

FIG. 7

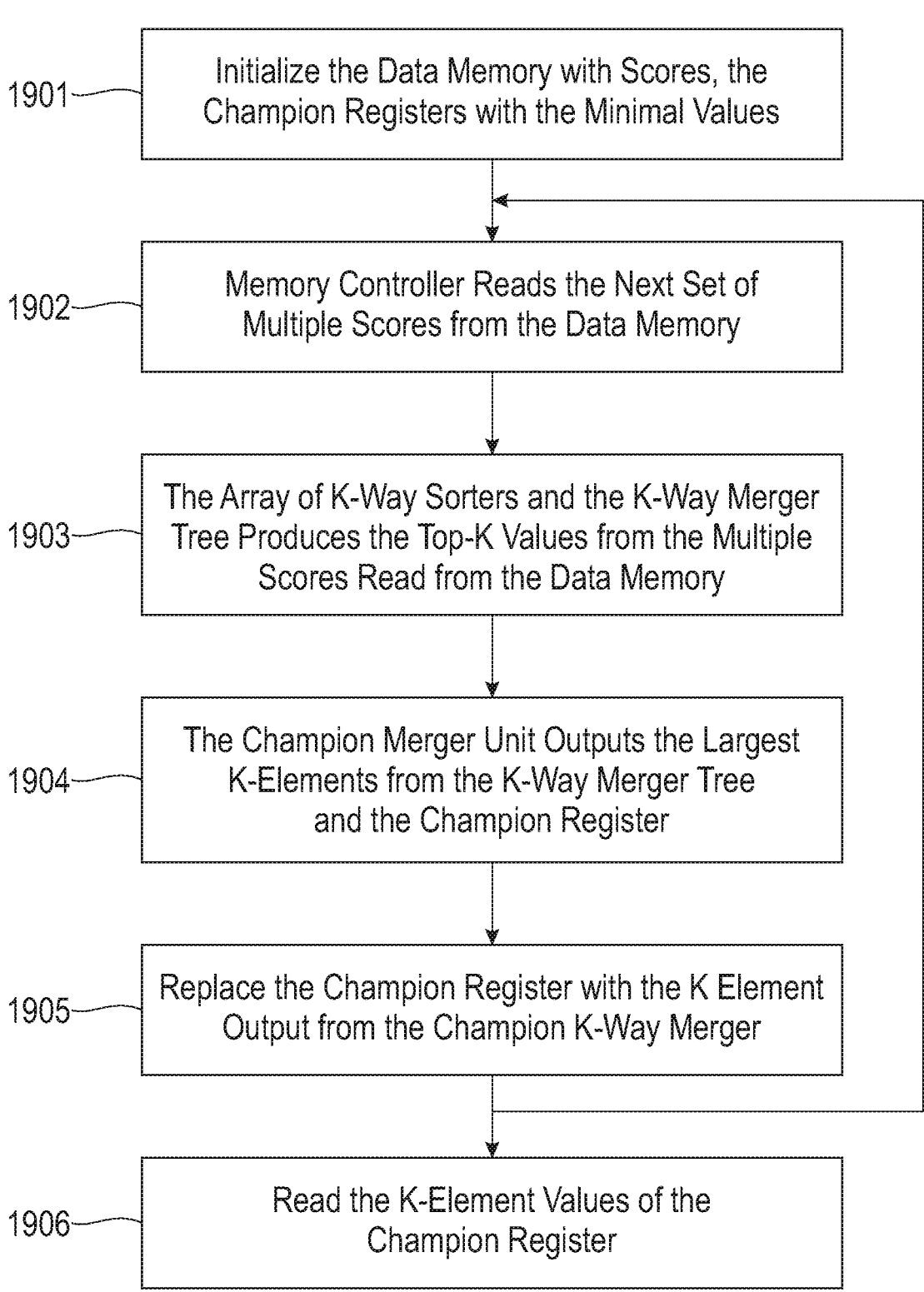

1901 — Initialize the Data Memory with Scores, the Champion Registers with the Minimal Values 1902 — Memory Controller Reads the Next Set of Multiple Scores from the Data Memory 1903 — The Array of K-Way Sorters and the K-Way Merger Tree Produces the Top-K Values from the Multiple Scores Read from the Data Memory 1904 — The Champion Merger Unit Outputs the Largest K-Elements from the K-Way Merger Tree and the Champion Register 1905 — Replace the Champion Register with the K Element Output from the Champion K-Way Merger 1906 — Read the K-Element Values of the Champion Register

FIG. 19

NEURAL NETWORK ACCELERATOR OUTPUT RANKING

This invention was made with Government support under FA8750-18-C-0015 awarded by USAF, AFMC Air Force Research Laboratory. The Government has certain rights in this invention.

BACKGROUND

Embodiments of the present disclosure relate to neural network processing, and more specifically, to neural network accelerator output ranking.

BRIEF SUMMARY

According to embodiments of the present disclosure, neural network processors are provided. In various embodiments, a system comprises a data memory; a memory controller configured to access the data memory; a plurality of comparators configured in a tree; a register; and a two-way comparator. The memory controller is configured to provide a first plurality of values from the data memory to the comparator tree. The comparator tree is configured to perform a plurality of concurrent pairwise comparisons of the first plurality of values to arrive at a first greatest value of the first plurality of values. The two-way comparator is configured to output the greater of the greatest value from the comparator tree and a stored value from the register. The register is configured to store the output of the two-way comparator.

In various embodiments, a system comprises a data memory; a memory controller configured to access the data memory; a plurality of k-way sorters; a plurality of k-way mergers configured in a tree; a register; and a k-way merger. The memory controller is configured to provide a first plurality of values from the data memory to the plurality of k-way sorters. The plurality of k-way sorters is configured to provide sorted output of the first plurality of values to the merger tree. The merger tree is configured to perform a plurality of concurrent mergers of the first plurality of values to arrive at first set of greatest values of the first plurality of values. The k-way merger is configured to output k greatest of the first set of greatest values from the merger tree and a set of stored values from the register. The register is configured to store the output of the merger.

According to embodiments of the present disclosure, methods of and computer program products for operating neural network processors are provided. A first plurality of values is provided from a data memory to a comparator tree. The comparator tree performs a plurality of concurrent pairwise comparisons of the first plurality of values to arrive at a first greatest value of the first plurality of values. A two-way comparator outputs the greater of the greatest value from the comparator tree and a stored value from a register. The output of the two-way comparator is stored in the register.

According to embodiments of the present disclosure, methods of and computer program products for operating neural network processors are provided. A first plurality of values is provided from a data memory to a plurality of k-way sorters. Sorted output of the plurality of k-way sorters is provided to a merger tree. The merger tree performs a plurality of concurrent mergers of the first plurality of values to arrive at first set of greatest values of the first plurality of values. A k-way merger outputs k greatest of the first set of greatest values from the merger tree and a set of stored values from a register. The output of the merger is stored in the register.

BRIEF DESCRIPTION OF THE SEVERAL VIEWS OF THE DRAWINGS

FIG. 7 illustrates a method of determining a largest score according to embodiments of the present disclosure.

FIG. 19 illustrates a method of using a K-way merger tree to get the top k elements according to embodiments of the present disclosure.

DETAILED DESCRIPTION

Figure 1:
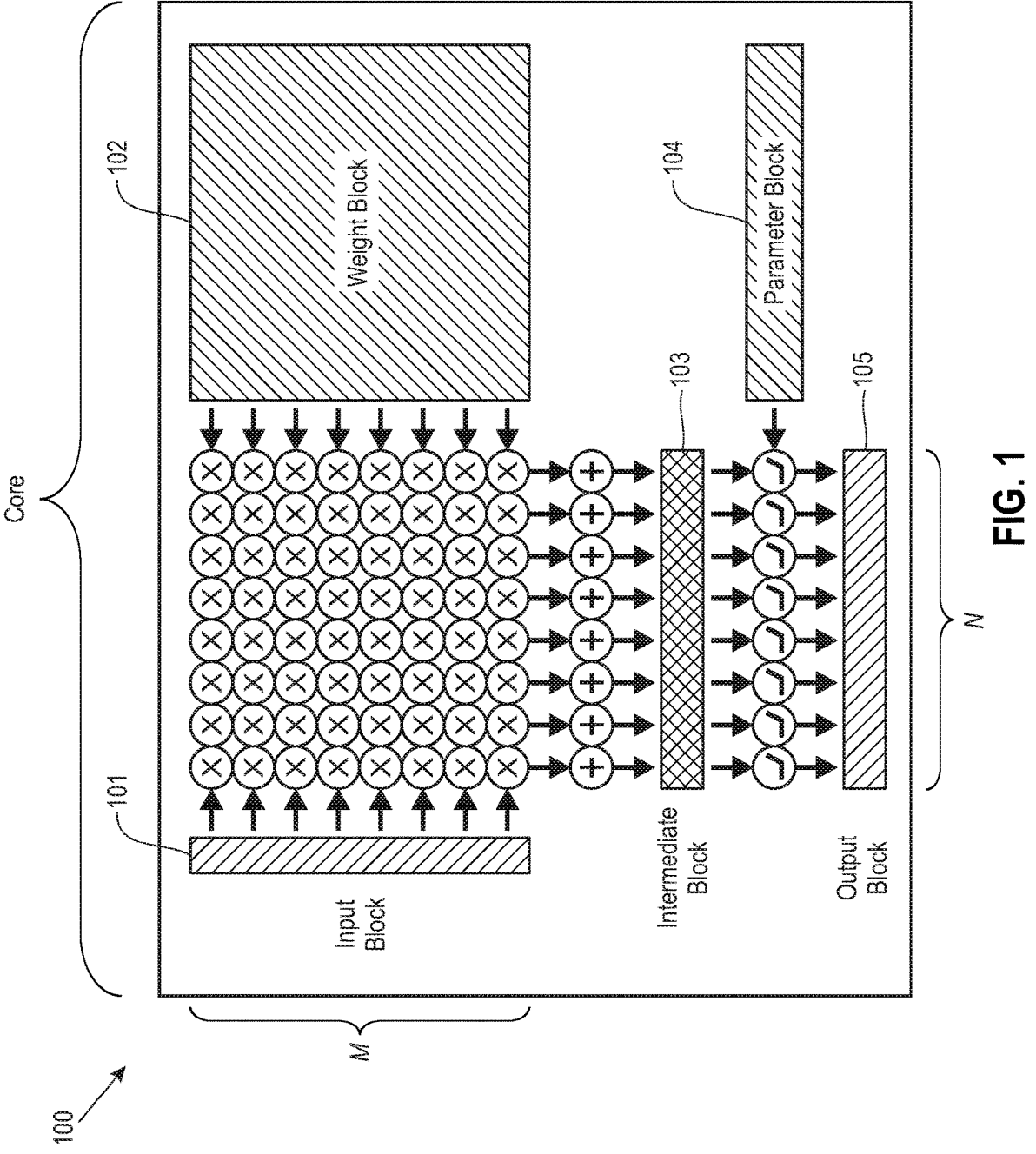
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ. In some embodiments, activation function σ requires no additional parameters, in which case the additional dimension is unnecessary. However, in some embodiments, activation function σ requires at least one additional parameter, which appears in dimension o.

An element of a layer's output data tensor Y can be computed as in Equation 1 where the neuron activation function σ is configured by the vector of activation function parameters V[i,j,k,:], and the weighted sum Z[i,j,k] can be computed as in Equation 2.

$$Y[i, j, k] = \sigma(V[i, j, k, :]; Z[i, j, k]) \qquad \text{Equation 1}$$

-continued $$Z[i, j, k] = \sum_{a=1}^{A} \sum_{b=1}^{B} \sum_{c=1}^{C} W[i, j, k, a, b, c] \cdot X[a, b, c] \qquad \text{Equation 2}$$

For simplicity of notation, the weighted sum in Equation 2 may be referred to as the output, which is equivalent to using a linear activation function $Y[i,j,k]=\sigma(Z[i,j,k])=Z[i,j,k]$, with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are parallel structures. Neurons in a given layer receive inputs, X with elements $x_i$ from one or more layers or other inputs. Each neuron computes its state, $y \in Y$ based on the inputs and weights W with elements $w_i$. In various embodiments, the weighed sum of inputs is adjusted by a bias b, and then the result is passed to a nonlinearity F(•). For example, a single neuron activation may be expressed as $y=F(b+\Sigma x_i w_i)$.

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
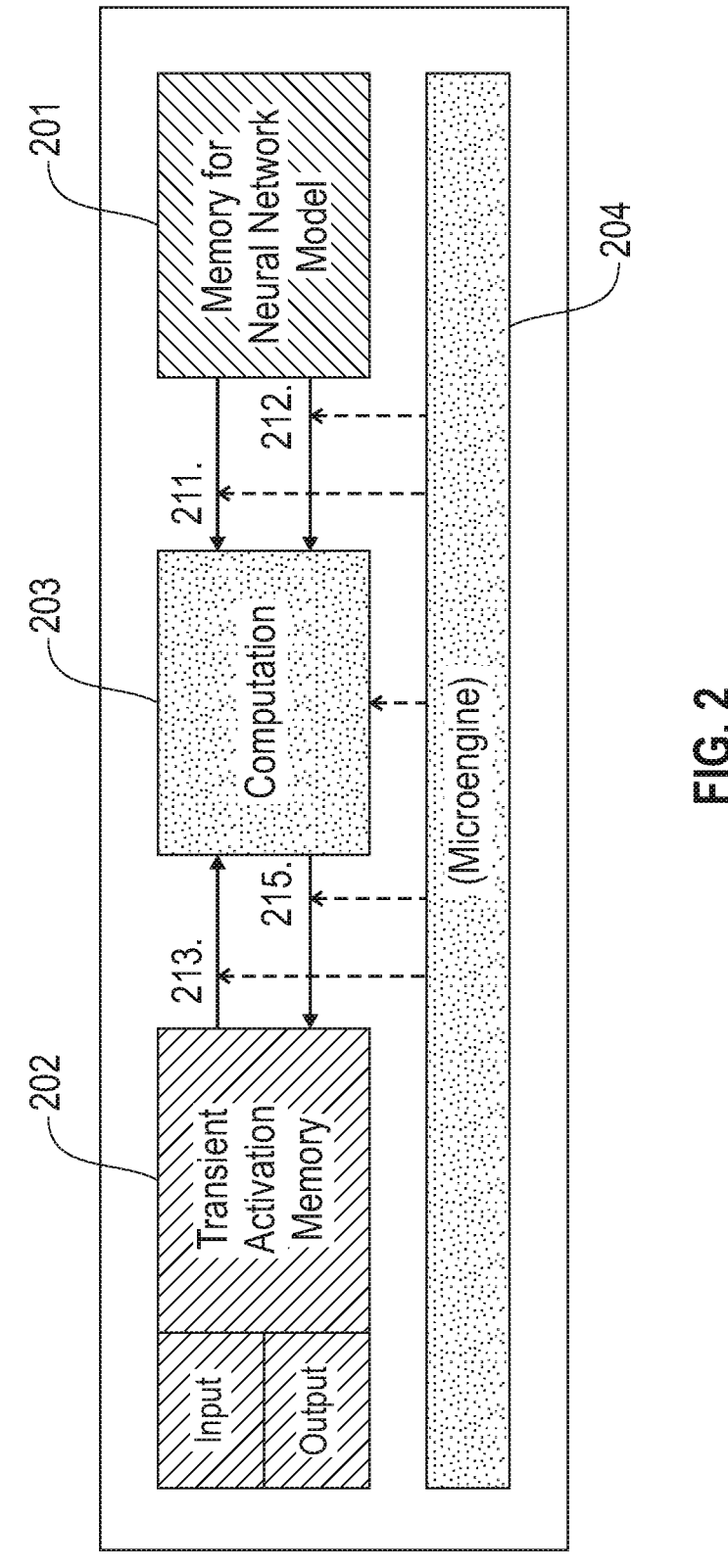
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
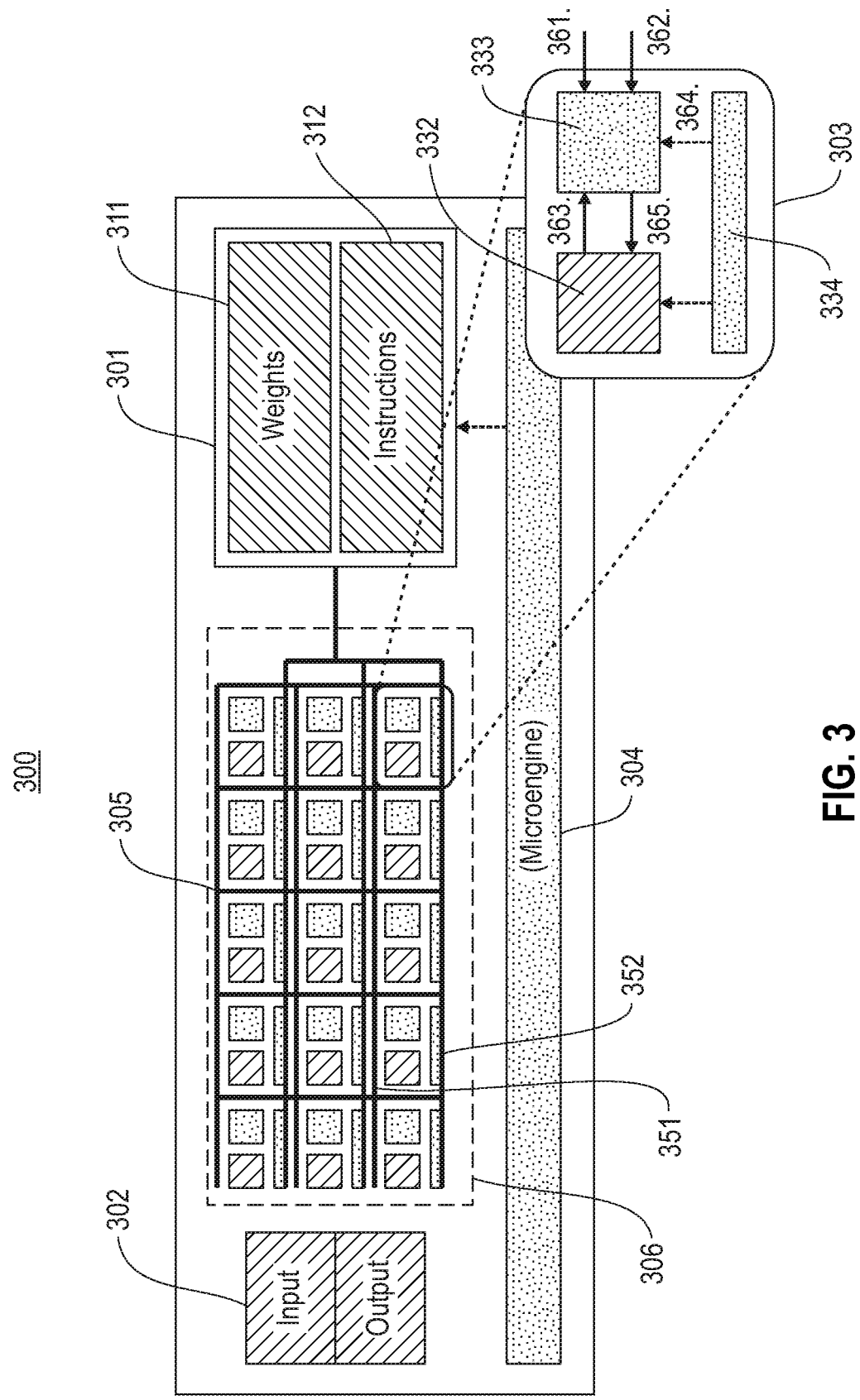
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weight portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the global microengine (chip microengine) and the local core controller (core microengine) collaboratively direct operations. In particular, at 361, compute instructions are loaded from instruction portion 312 of model memory 301 to the core controller 334 on each core 303 by global microengine 304. At 362, parameters (e.g., neural network/synaptic weights) are loaded from weight portion 311 of model memory 301 to the neural computation unit 333 on each core 303 by global microengine 304. At 363, neural network activation data are loaded from activation local activation memory 332 to neural computation unit 333 on each core 303 by local core controller 334. As noted above, the activations are provided to the neurons of the particular neural network defined by the model, and may originate from the same or another neural computation unit, or from outside the system. At 364, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 365, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) Core microcode is executed on the core microengines (e.g., 334). In the case of local computation, the core microcode includes instruction(s) to execute a full, single tensor operation. For example, a convolution between a weight tensor and a data tensor. In the case of distributed computation, the core microcode includes instruction(s) to execute a single tensor operation on the locally stored subset of the data tensor (and partial sums). Chip microcode is executed on the chip microengine (e.g., 304). Microcode includes instructions to execute all of the tensor operations in a neural network.

Figure 4:
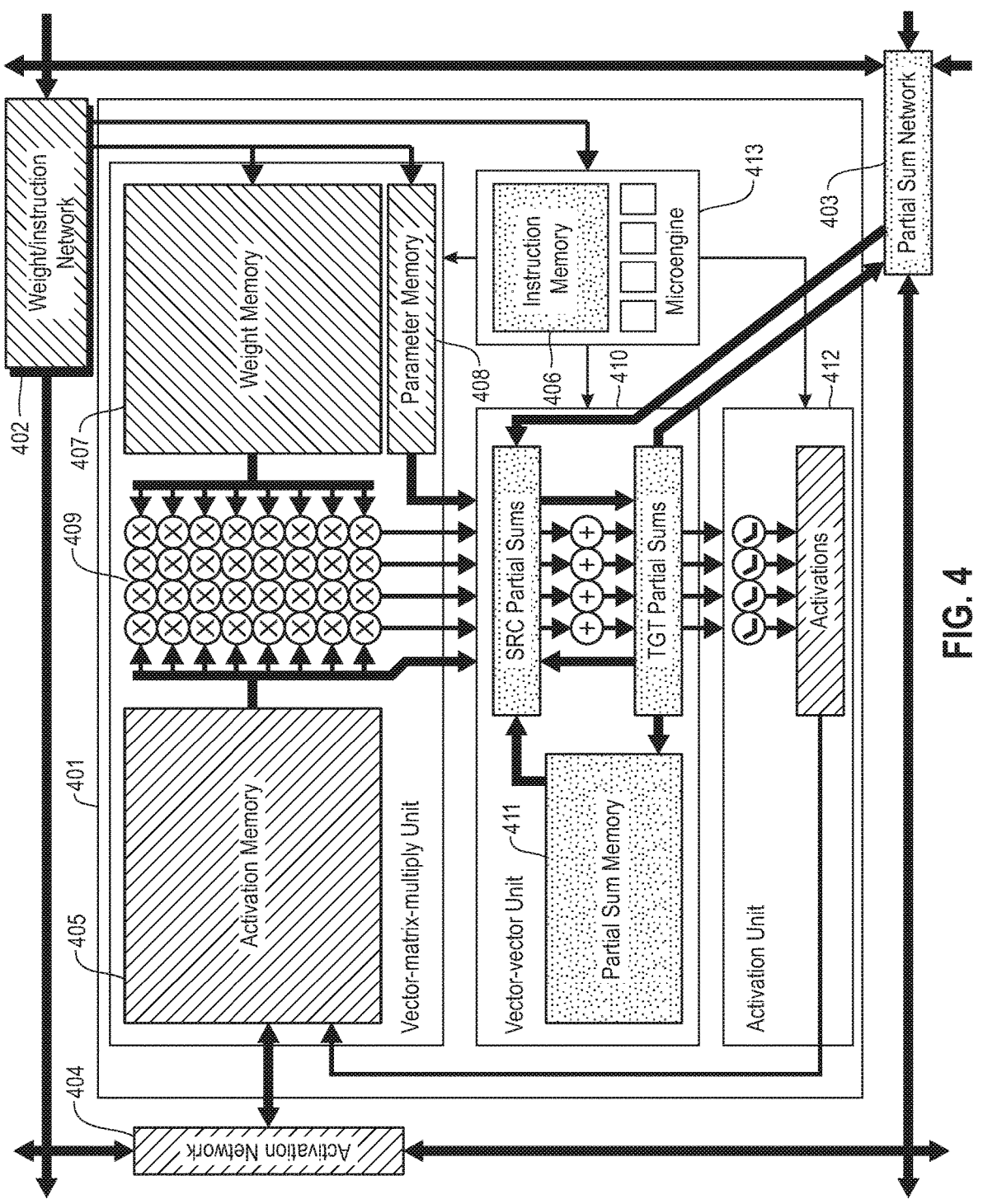
FIG. 4 illustrates a neural core and associated networks according to embodiments of the present disclosure.

With reference now to FIG. 4, an exemplary neural core and associated networks are illustrated according to embodiments of the present disclosure. Core 401, which may be embodied as described with reference to FIG. 1 is interconnected with additional cores by networks 402 . . . 404. In this embodiments, network 402 is responsible for distributing weights and/or instructions, network 403 is responsible for distributing partial sums, and network 404 is responsible for distributing activations. However, it will be appreciated that the various embodiments of the present disclosure may combine these networks, or further separate them into multiple additional networks.

Input activations (X) are distributed to core 401 from off-core via activation network 404 to activation memory 405. Layer instructions are distributed to core 401 from off-core via weight/instruction network 402 to instruction memory 406. Layer weights (W) and/or parameters are distributed to core 401 from off-core via weight/instruction network 402 to weight memory 407 and/or parameter memory 408.

The weight matrix (W) is read from weight memory 407 by Vector Matrix Multiply (WM) unit 409. The activation vector (V) is read from activation memory 405 by Vector Matrix Multiply (WM) unit 409. Vector Matrix Multiply (WM) unit 409 then computes vector-matrix multiplication $Z=X^TW$ and provides the result to Vector-Vector unit 410. Vector-Vector unit 410 reads additional partial sums from partial sum memory 411, and receives additional partial sums from off-core via partial sum network 403. A vector-vector operation is computed by Vector-Vector unit 410 from these source partial sums. For example, the various partial sums may in turn be summed. The resulting target partial sums are written to partial sum memory 411, sent off-core via partial sum network 403, and/or fed back for further processing by Vector-Vector unit 410.

The partial sum results from Vector-Vector unit 410, after all computation for a given layer's inputs is complete, are provided to activation unit 412 for the computation of output activations. The activation vector (Y) is written to activation memory 405. Layer activations (including the results written to activation memory) are redistributed across cores from activation memory 405 via activation network 404. Upon receipt, they are written to local activation memory to each receiving core. Upon completion of processing for a given frame, the output activations are read from activation memory 405 and sent off-core via network 404.

Accordingly, in operation, a core control microengine (e.g., 413) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, causing the vector-matrix multiply unit to compute a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation function compute operation, such that the activation function arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 410 include Vector Matrix Multiply (VMM) unit 409, constants from parameter memory 408, partial sum memory 411, partial sum results from prior cycles (TGT partial sums); and partial sum network 403.

Targets for vector-vector unit 410 include partial sum memory 411, partial sum results for subsequent cycles (SRC partial sums), activation unit 412, and partial sum network 403.

Accordingly, a given instruction may read or write from activation memory 405, read from weight memory 407, or read or write from partial sum memory 411. Compute operations performed by the core include vector matrix multiplication by VMM unit 409, vector (partial sum) operations by vector-vector unit 410, and activation functions by activation unit 412.

Control operations include updating program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters in microengines.

It will be appreciated from the above that neurosynaptic accelerators can provide a huge boost in neural network evaluation. These accelerator may be highly optimized for neural network evaluation, but not for general purpose tasks.

In scenarios involving running a deep-learning/deep-inference neural network, the neural network produces output data consisting of hundreds or thousands of scores. For an image recognition example, the input data are image data. The output data are scores of recognized objects. Each output score corresponds to the likelihood that the input image shows the corresponding object. For example, the output of one output neuron may be assigned to cars, another may be assigned to birds, and so on. The neural network learning process changes the network weight so that when a bird image is provided as an input image, the output neuron assigned to the bird type produces the largest output.

Figure 5:
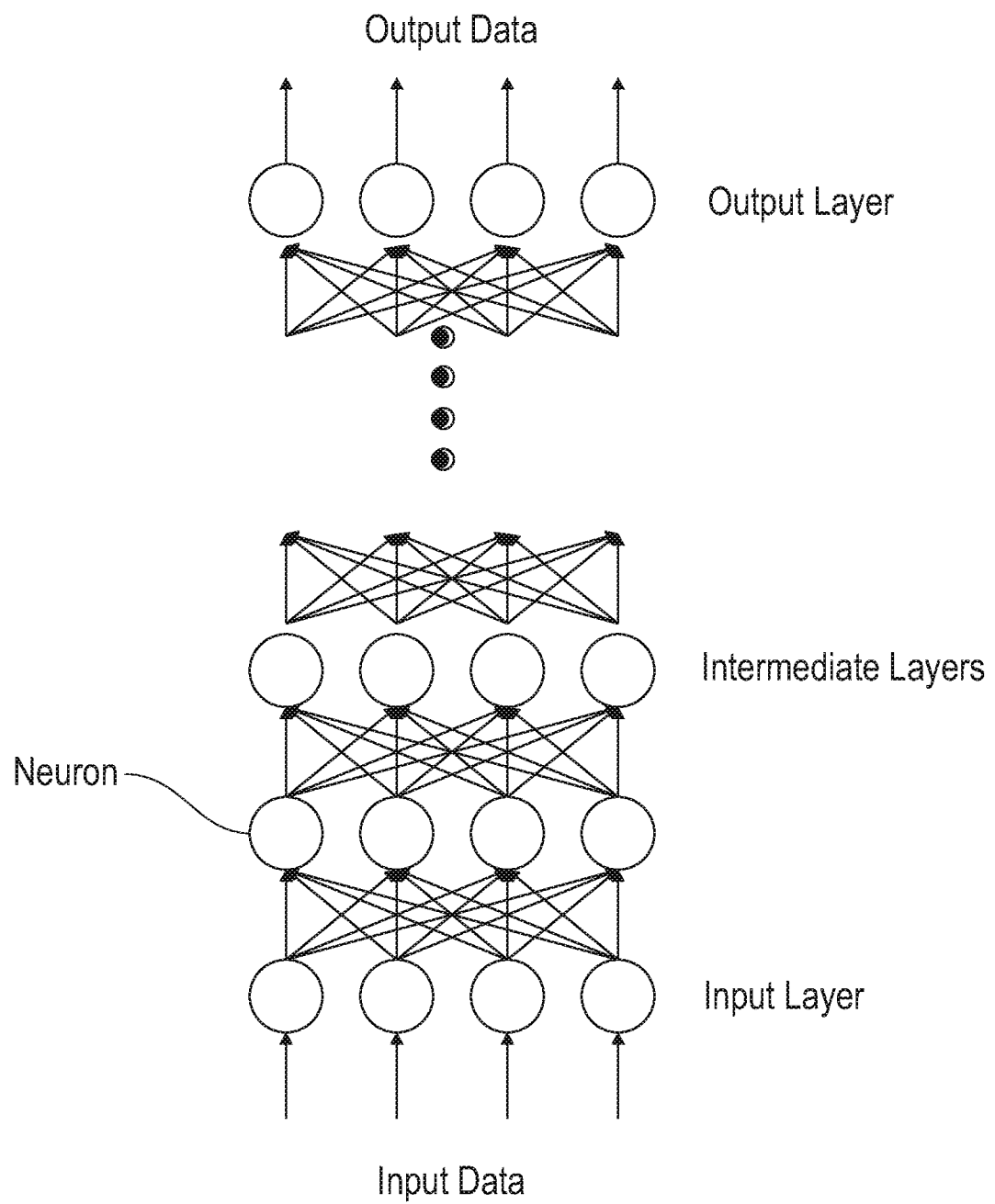
FIG. 5 is a schematic view of an exemplary neural network according to embodiments of the present disclosure.

A schematic view of an exemplary neural network is provided in FIG. 5. A deep learning/deep inference neural network includes a plurality of intermediate layers. Output data may include hundreds or even thousands of scores of object types.

At the end of the neural network evaluation, there is a need to sort the order of output data, and rank them to find out what the answer of the neural network. However, the neural network accelerator framework of evaluating neural network is not well suited to this type of work, that is it is not well suited to sorting a collection of numbers. This task may be performed on a CPU. However, a CPU approach is not suitable for certain systems. For example, in real-time systems with a high-performance neurosynaptic accelerator the CPU load of score sorting may be high. In another example, mobile neural network systems may not have a CPU host, or cannot afford to run the CPU all the time and drain the battery.

To address this need, the present disclosure provides a very high-performance apparatus that can find the top-k items with highest scores out of hundreds, thousands or even more items. The circuit require very little logic, and consumes a very small amount of energy.

Figure 6:
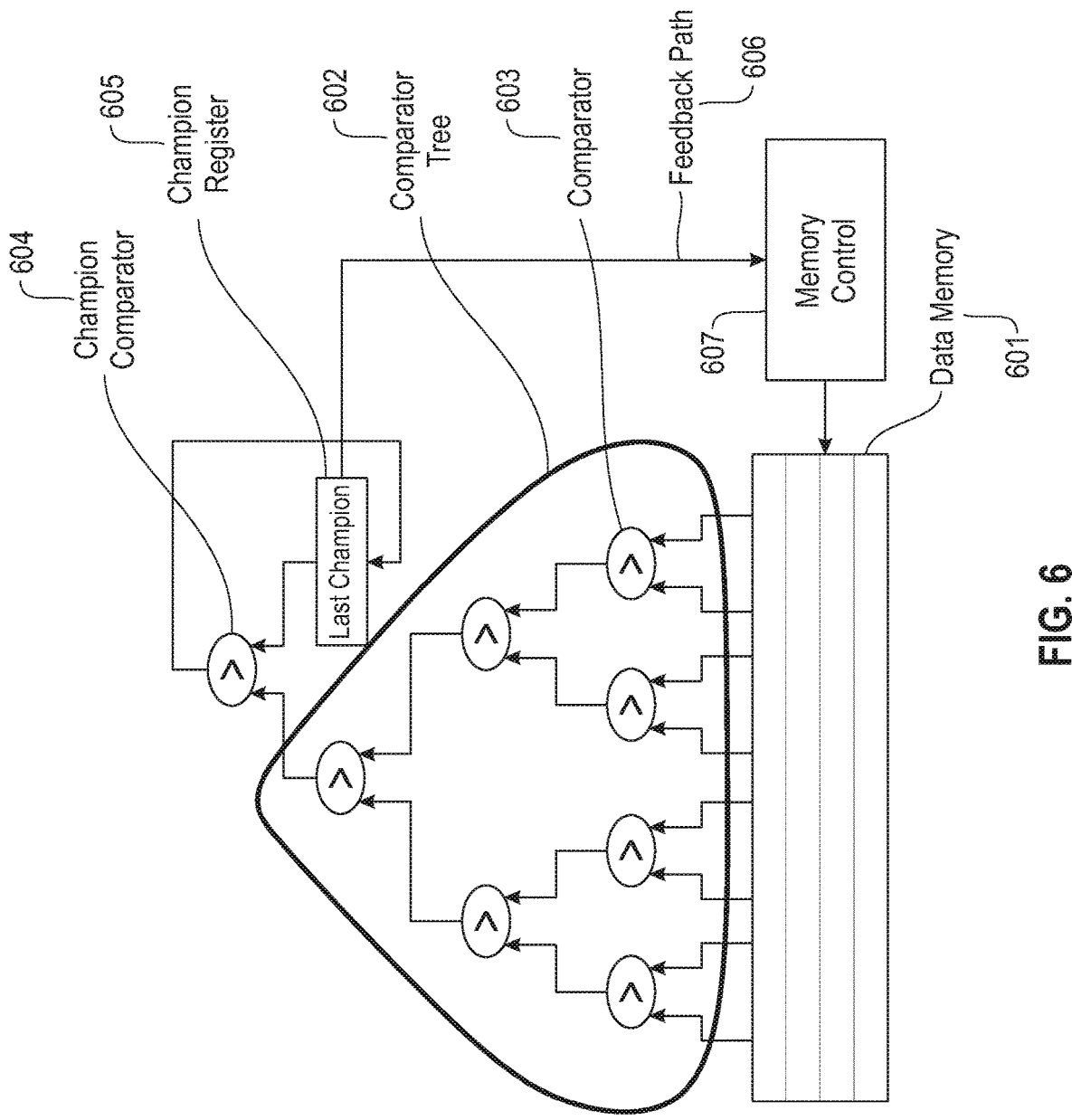
FIG. 6 is a schematic view of a circuit for determining a single top value of a plurality of values according to embodiments of the present disclosure.

Referring now to FIG. 6, a schematic view is provided of a circuit for determining a single top value of a plurality of values. In this example, a plurality of values are read from data memory 601. A comparator tree 602 comprising a plurality of comparators 603 is used to determine a highest value. The highest value is compared by a final comparator 604 to a last champion value from a prior iteration, stored in champion register 605. The result may be fed back via memory control 606 to data memory 601 for use in further execution.

Referring now to FIG. 7, a method of determining a largest score is illustrated. At 701, the data memory is initialized with scores and the champion register is initialized with a minimal value. At 702, the memory controller reads multiple scores from the data memory. At 703, the comparator tree determines the largest value out of the multiple scores. At 704, the champion comparator outputs the larger of the output from the comparator tree and the champion register. At 705, the output from the champion comparator is written to the champion register. At 706, the content of the champion register is read.

The above method may be understood by analogy to competitive gameshows, where the winner among fresh participants challenges the champion from a previous show. If a challenger wins, they become the new champion.

In various embodiments, the comparator tree is built as a binary tree with $2^N$ inputs, where N is the depth of the tree. The entire tournament may be run sequentially to decide a new champion before reading a new set of values. Alternatively, this process may be pipelined. In such embodiments, $2^N$ inputs are read from the memory every clock cycle and sent to the comparator tree before the comparator chooses the challenger and the new champion. In pipelined embodiments, the largest score can be chosen in a number of clock cycles equal to (Number of Scores)/$2^N$+(Pipeline Delay).

Figure 8A:
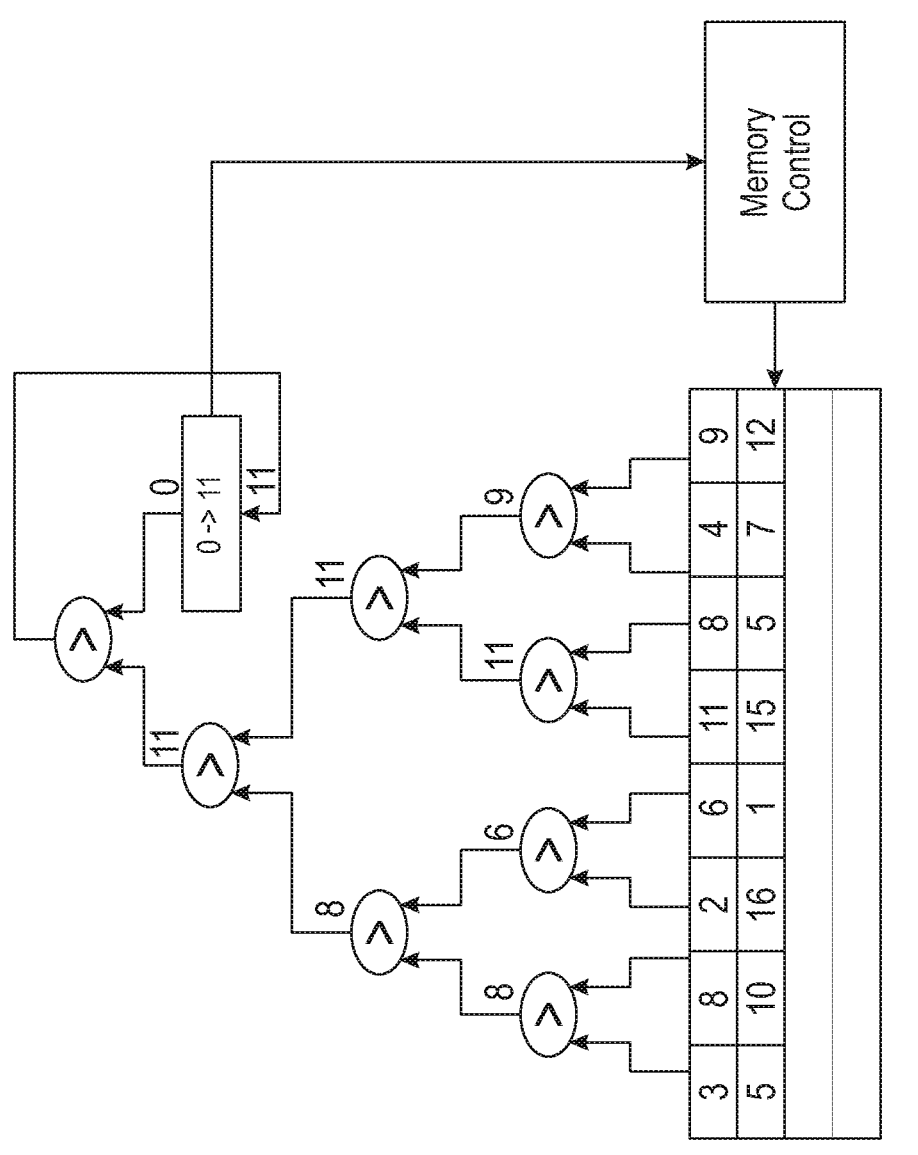
FIGS. 8A-B illustrate exemplary consecutive iterations of the system of FIG. 6 according to embodiments of the present disclosure.
Figure 8B:
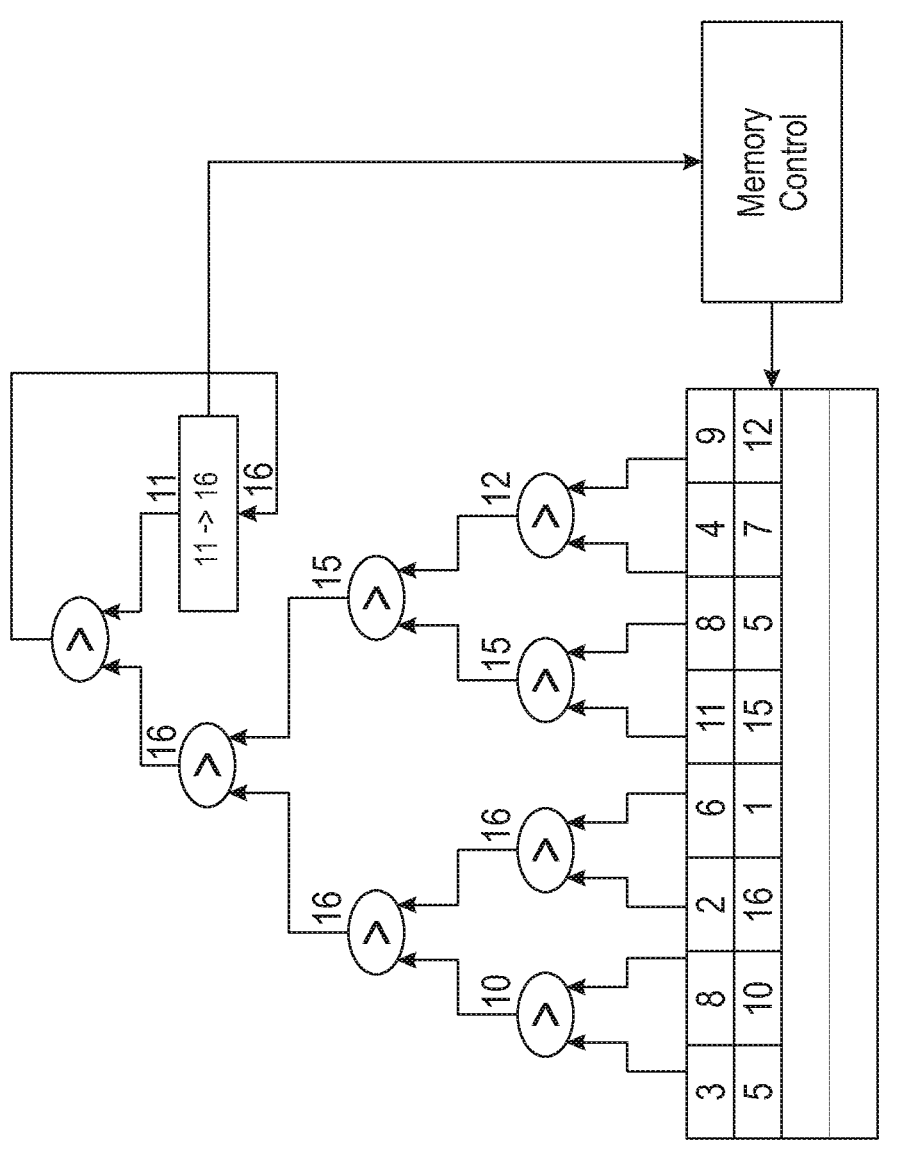

Referring to FIGS. 8A-B, exemplary consecutive iterations of the system of FIG. 6 are illustrated. In this example, the data memory includes two sets of data, shown in separate rows. The champion register is initialized to 0. The winner at each comparator is shown in FIG. 8A for the first row of data. FIG. 8A also shows the champion register set to 11, which is the largest value from the first row of the memory. The winner at each comparator is shown in FIG. 8B for the second row of data. In FIG. 8B, the champion register is replaced with 16, which is the largest value from both rows of the memory.

In various embodiments, the top K elements are chosen instead of the top 1 element. As set forth below, some such embodiments use a similar approach to the top-1 selector, with the addition of additional control. When the largest score is found, the largest score is erased from the data memory by overwriting a minimal value to its location. The binary comparison tree, the champion comparator, and the champion register can be extended to pass and store the address and index of the winner. Then, the feedback path can direct the memory controller to overwrite the winning score from the data memory. After the memory update, the process is run again to get the 2nd largest score. The procedure is repeated to get successively larger elements in the memory.

Figure 9:
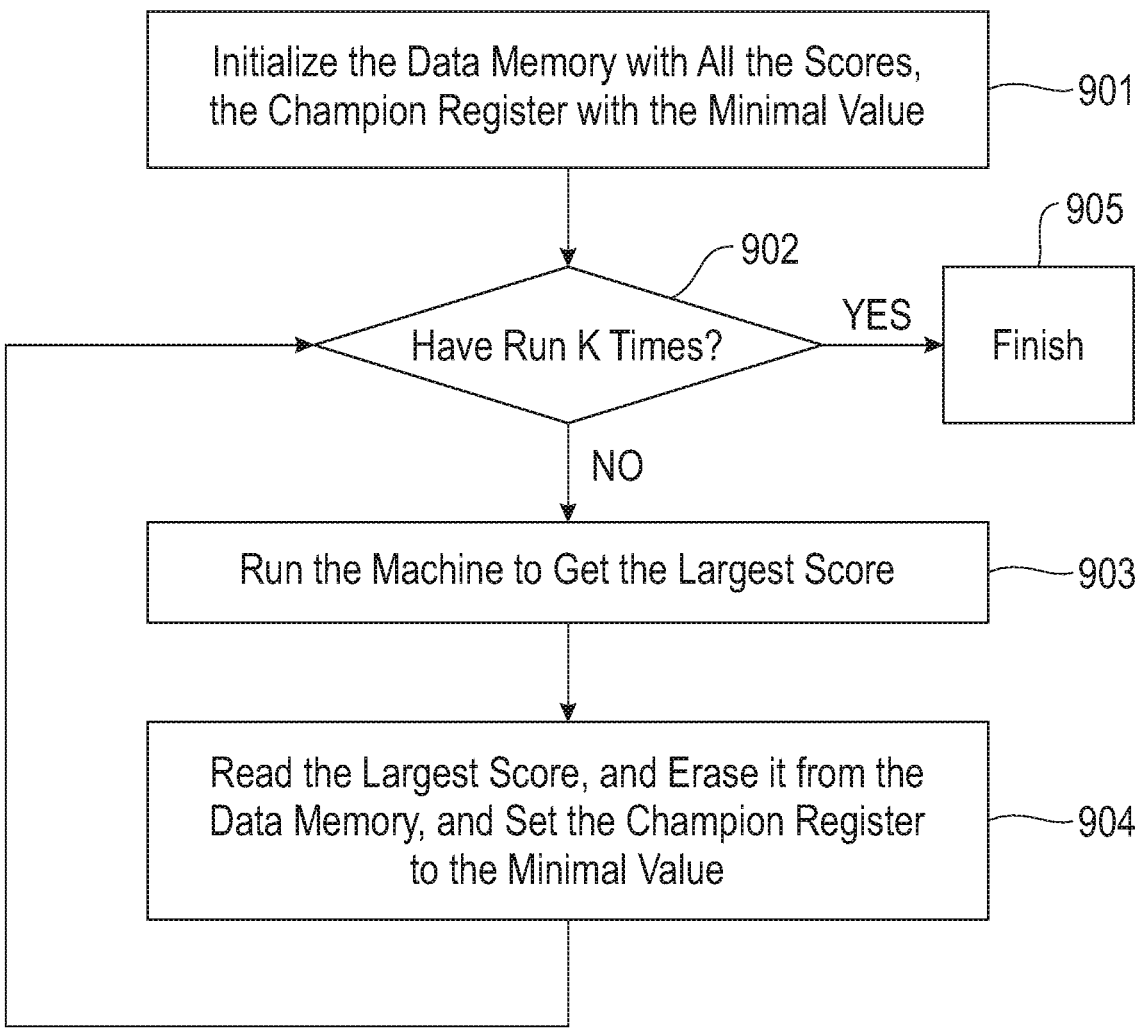
FIG. 9 illustrates a process of obtaining the top K scores according to embodiments of the present disclosure.

Referring to FIG. 9, a process of obtaining the top K scores is illustrated according to embodiments of the present disclosure. At 901, the data memory is initialized with all the scores, and the champion register is initialized with a minimal value. At 902, the number of iterations is checked. If K iterations have been completed, then the process ends at 905. At 903, the top-1 process described above is run to get the largest score. At 904, the largest score is read and erased from the data memory, and the champion register is set to the minimal value.

Figure 10A:
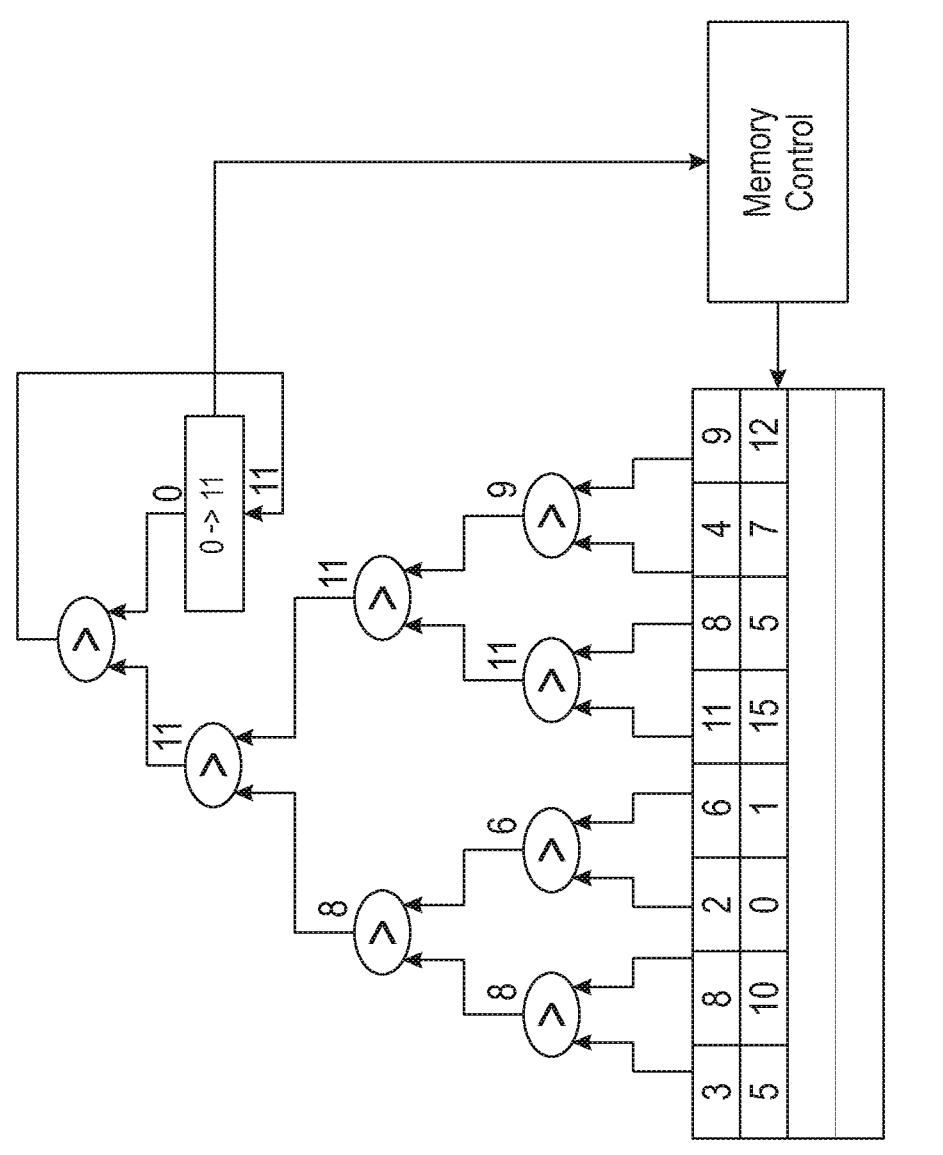
FIGS. 10A-B illustrates exemplary consecutive iterations of the system of FIG. 9 according to embodiments of the present disclosure.
Figure 10B:
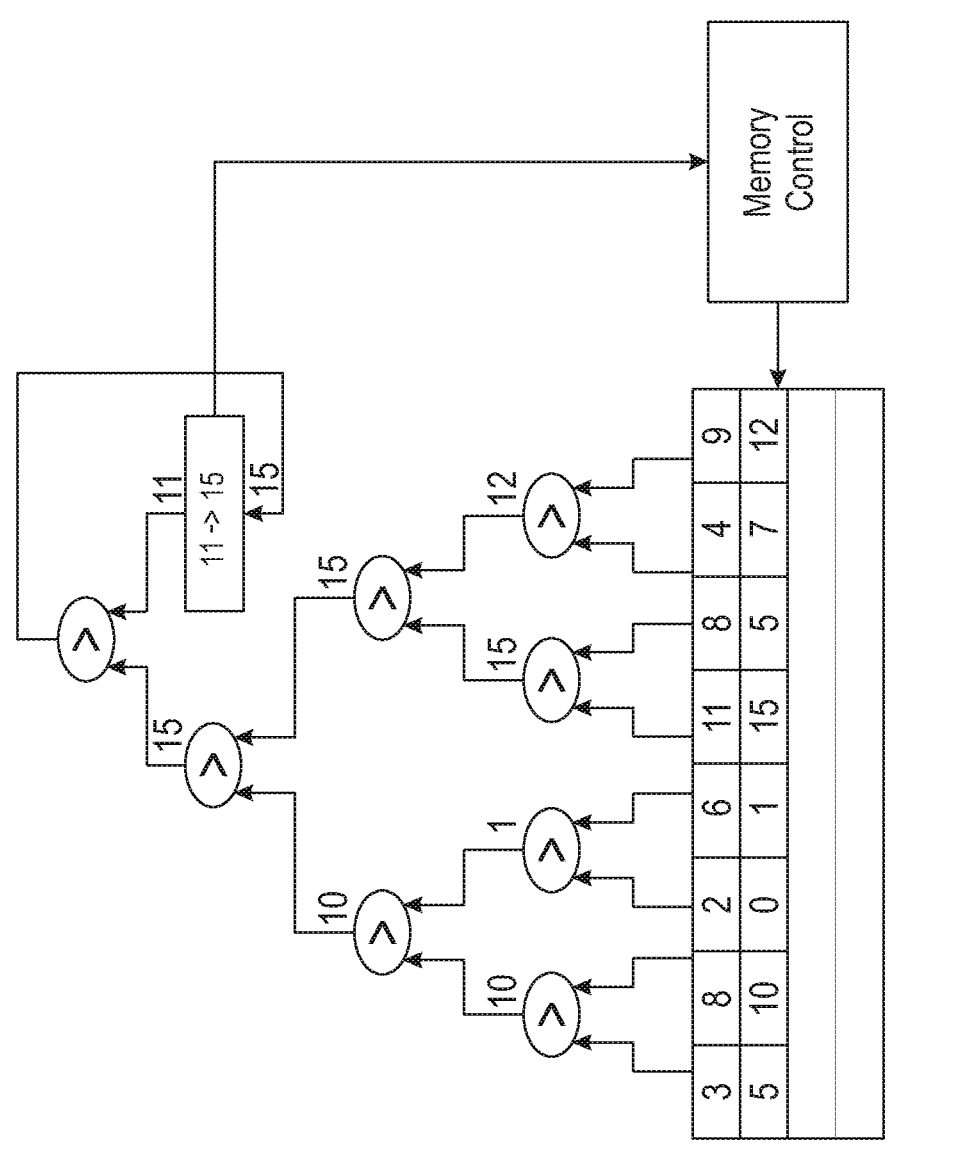

Referring to FIGS. 10A-B, exemplary consecutive iterations of the system of FIG. 9 are illustrated. The starting condition for FIGS. 10A-B follows the iterations depicted in FIGS. 8A-B. In particular, the score 16 on the second row, 3rd position from left has been updated with 0, as it was the highest value of the prior iterations. As a result of the iterations depicted in FIGS. 10A-B, the second largest element 15 out of the original set of scores is selected.

To choose the top K elements, the round of selecting the largest score is repeated K times to obtain the largest K scores from the collection of scores. In many use cases, only a small number of the top scores are needed. That does not require a full sorting algorithm. Accordingly, the time to compute K top elements is O(log 2(N)*K) where N is the number of input scores and K is the number of top scores needed. When K is a small constant, the circuit performs the task in O(log 2(N)).

In various embodiments, top-K selection is provided using multiple comparator trees. This approach allows further acceleration through parallel computation.

Figure 11:
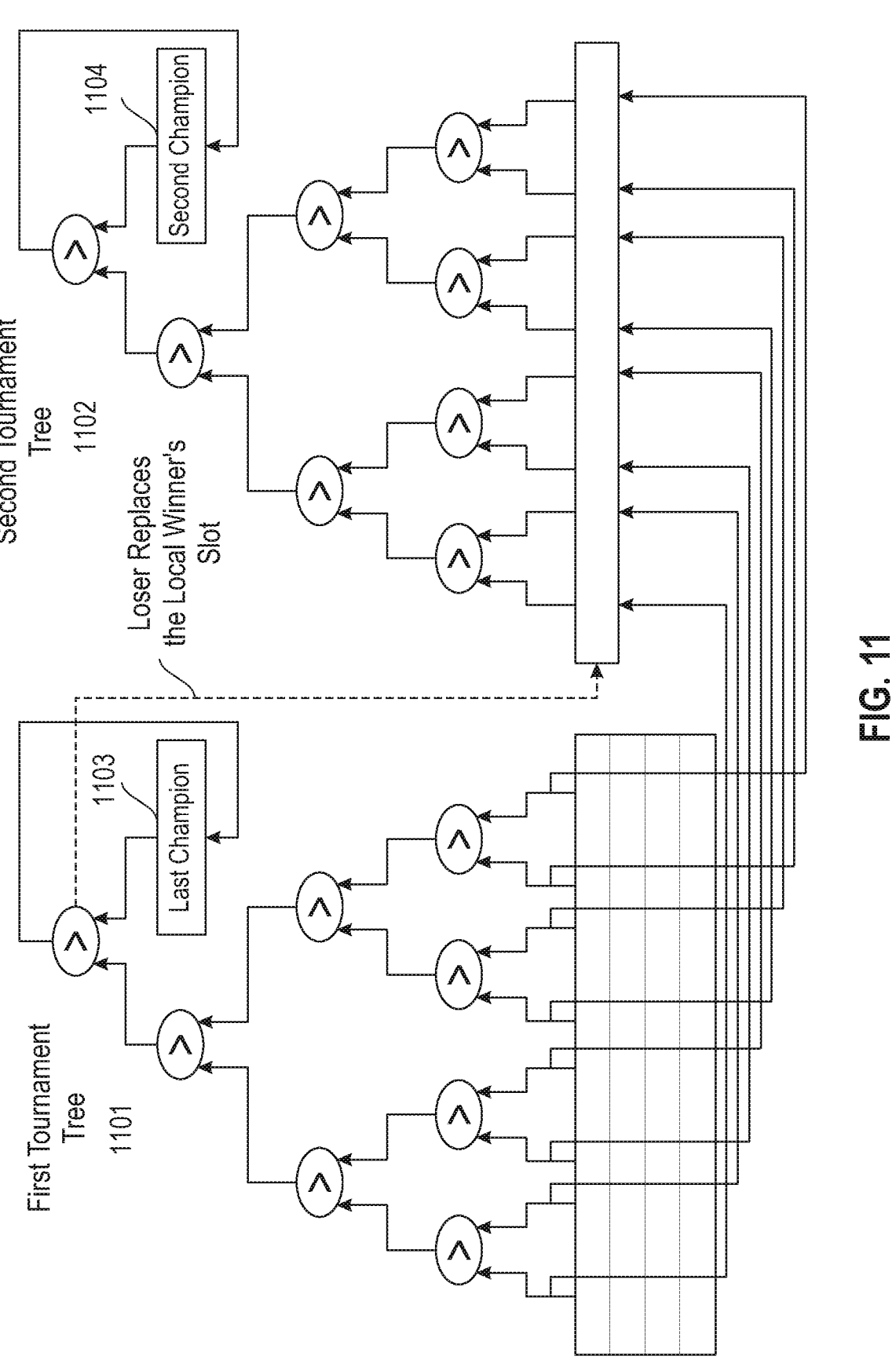
FIG. 11 illustrates an exemplary configuration using multiple comparator trees according to embodiments of the present disclosure.

Referring to FIG. 11, an exemplary configuration using multiple comparator trees is illustrated. In this configuration, the second tournament is carried out among all the elements except the maximum object. The loser of the champion comparator from the first tree replaces the winner in the second tournament tree.

The operation of the first comparator tree is the same as the top-k configuration described above. The input scores to the first comparator tree 1101 are forwarded to the second comparator tree 1102. However, the slot corresponding to the winner of the comparator tree 1101 is replaced with the loser of the first champion comparator 1103. The second comparator tree 1102 performs the rest of the task in the same way. In effect, the second comparator tree 1102 performs the tournament without the winner of the first comparator tree 1101.

To obtain successive (e.g., 3rd and 4th) top scores, the address and index of the first and second winners are fed back to the memory, and contents are erased from the memory. In various embodiments, the number of comparator trees is increased in the same way.

Figure 12A:
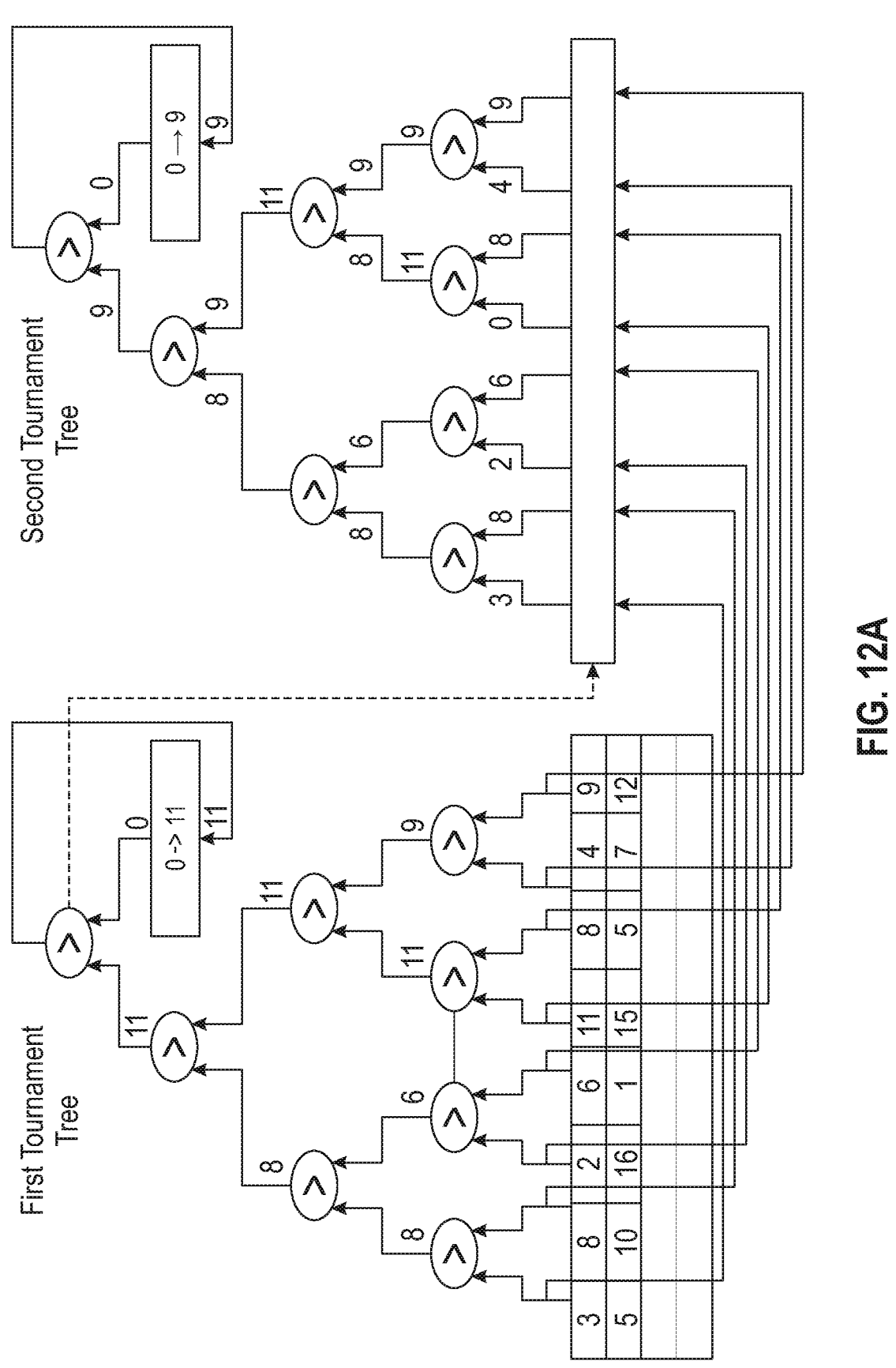
FIGS. 12A-B illustrates exemplary consecutive iterations of the system of FIG. 11 according to embodiments of the present disclosure.
Figure 12B:
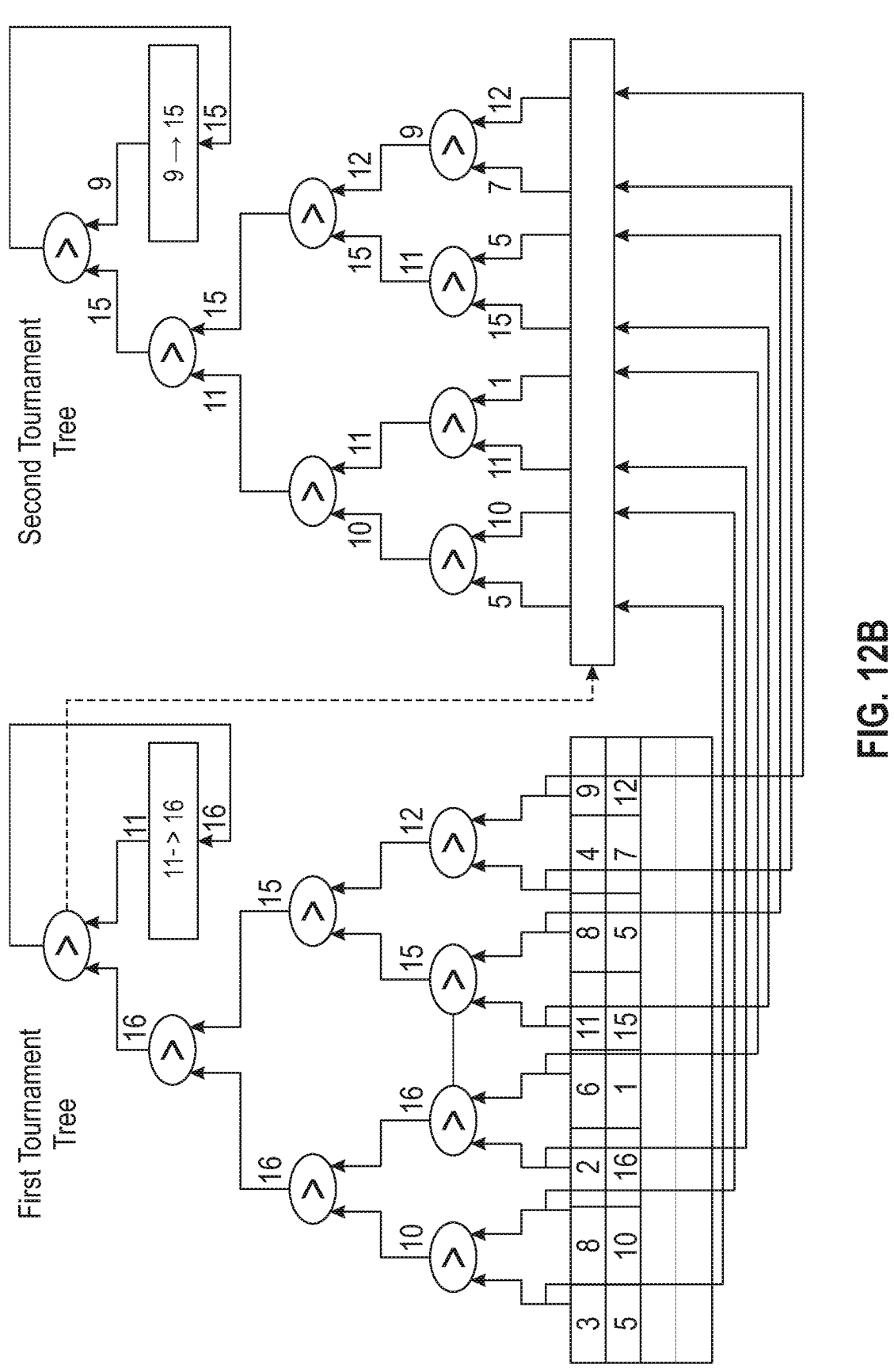

Referring to FIGS. 12A-B, exemplary consecutive iterations of the system of FIG. 11 are illustrated. The first round is shown in FIG. 12A, and the subsequent second round is shown in FIG. 12B. In FIG. 12B, the the 3rd slot from left in the second tree is replaced by the loser (11) from the first tree.

In other embodiments, the top K values are computed using a K-way merger-sorter network. Instead of running the same top-1 process iteratively k times, or using multiple trees, the next example selects the top k elements by producing sorted top-k elements from the sub-tree.

The overall tree structure remains the same as in prior examples. Each node of the binary tree uses a 2×K merger unit instead of a 2-way comparator. Entry from the memory to the binary tree is via a K-way sorter unit. Registers are also updated to K-way registers to keep the top k elements. Each connector is a K-way bus.

Figure 13:
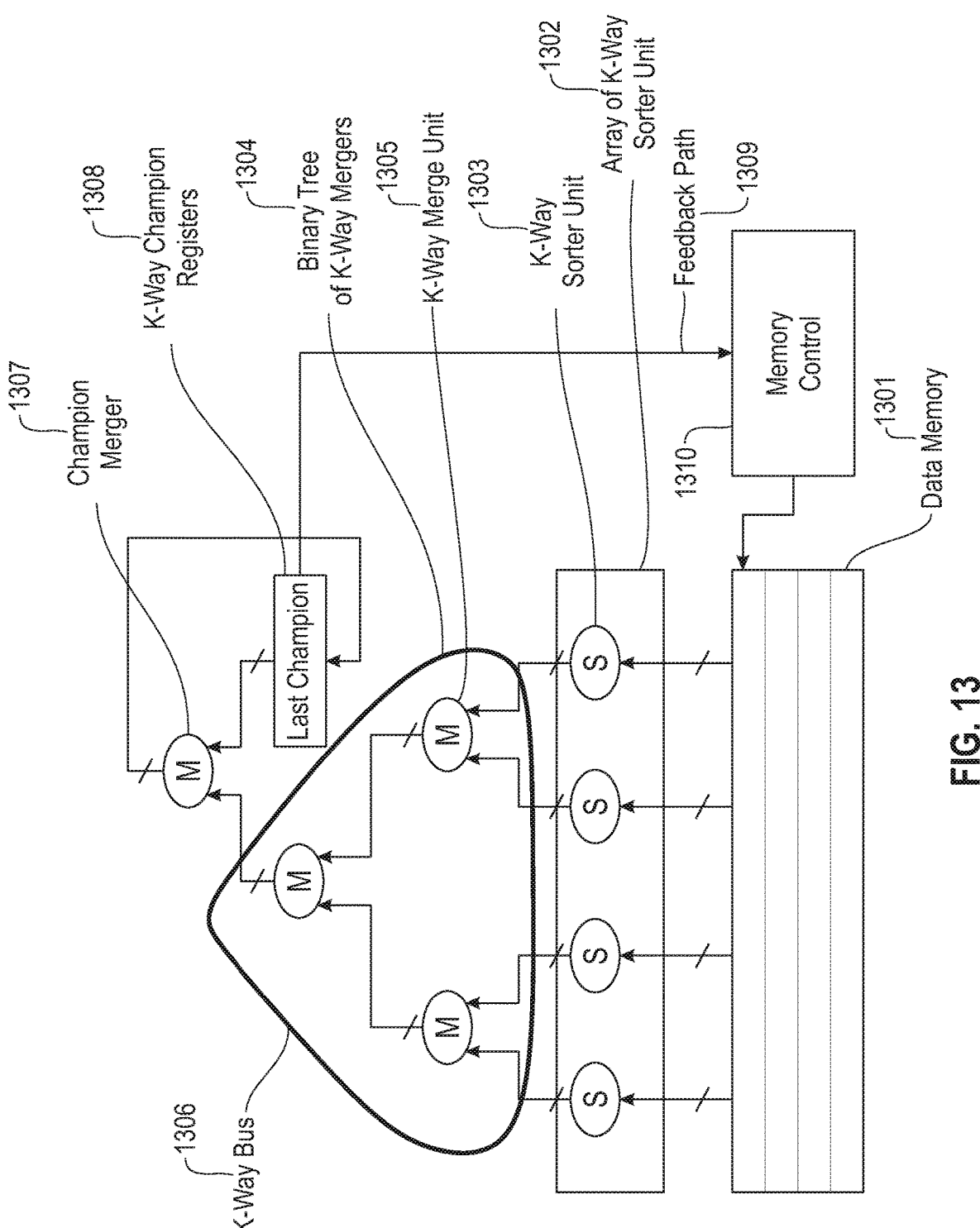
FIG. 13 is a schematic view of a circuit for determining a plurality of top values of a plurality of values according to embodiments of the present disclosure.

Referring to FIG. 13, a data memory 1301 provides data to an array 1302 of K-way sorter 1303. The output of the sorter units is provided to a binary tree 1304 of k-way mergers 1305 connected by a bus 1306. The highest value is provided to a final merger 1307 with a last champion value from a prior iteration, stored in champion register 1308. The result may be fed back via memory control 1310 to data memory 1301 for use in further execution.

Figure 14:
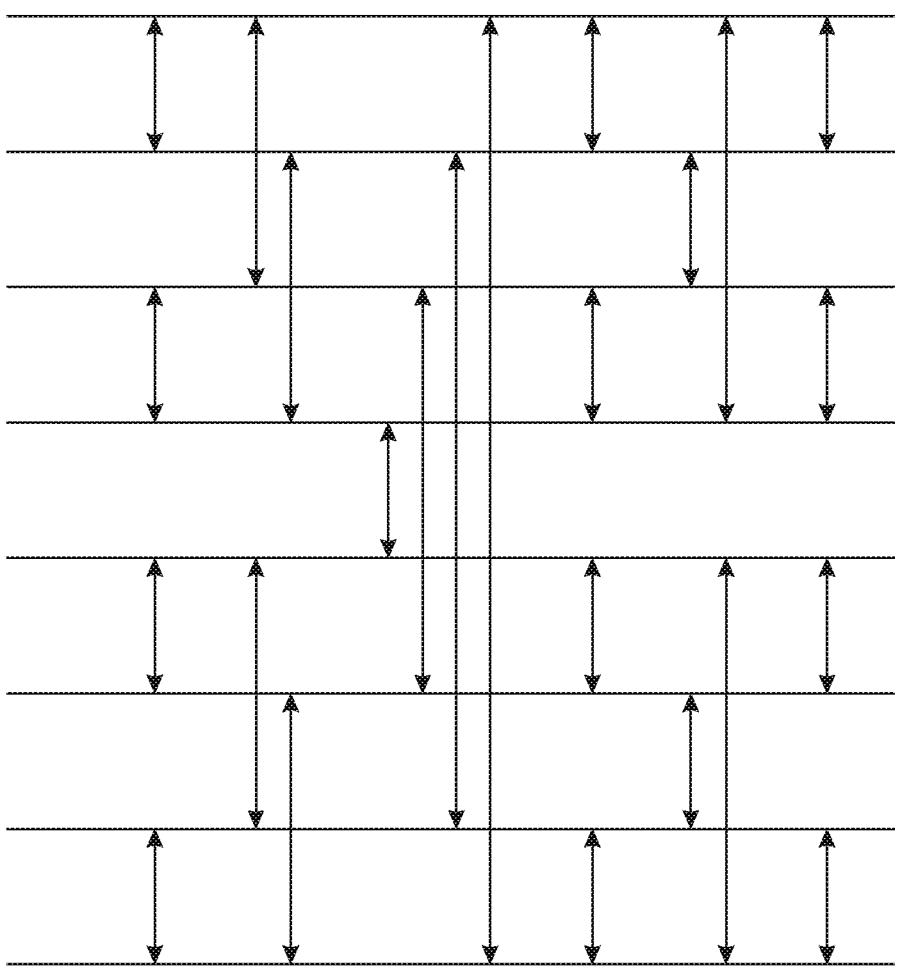
FIG. 14 illustrates a K-way sorter unit according to embodiments of the present disclosure.
Figure 15:
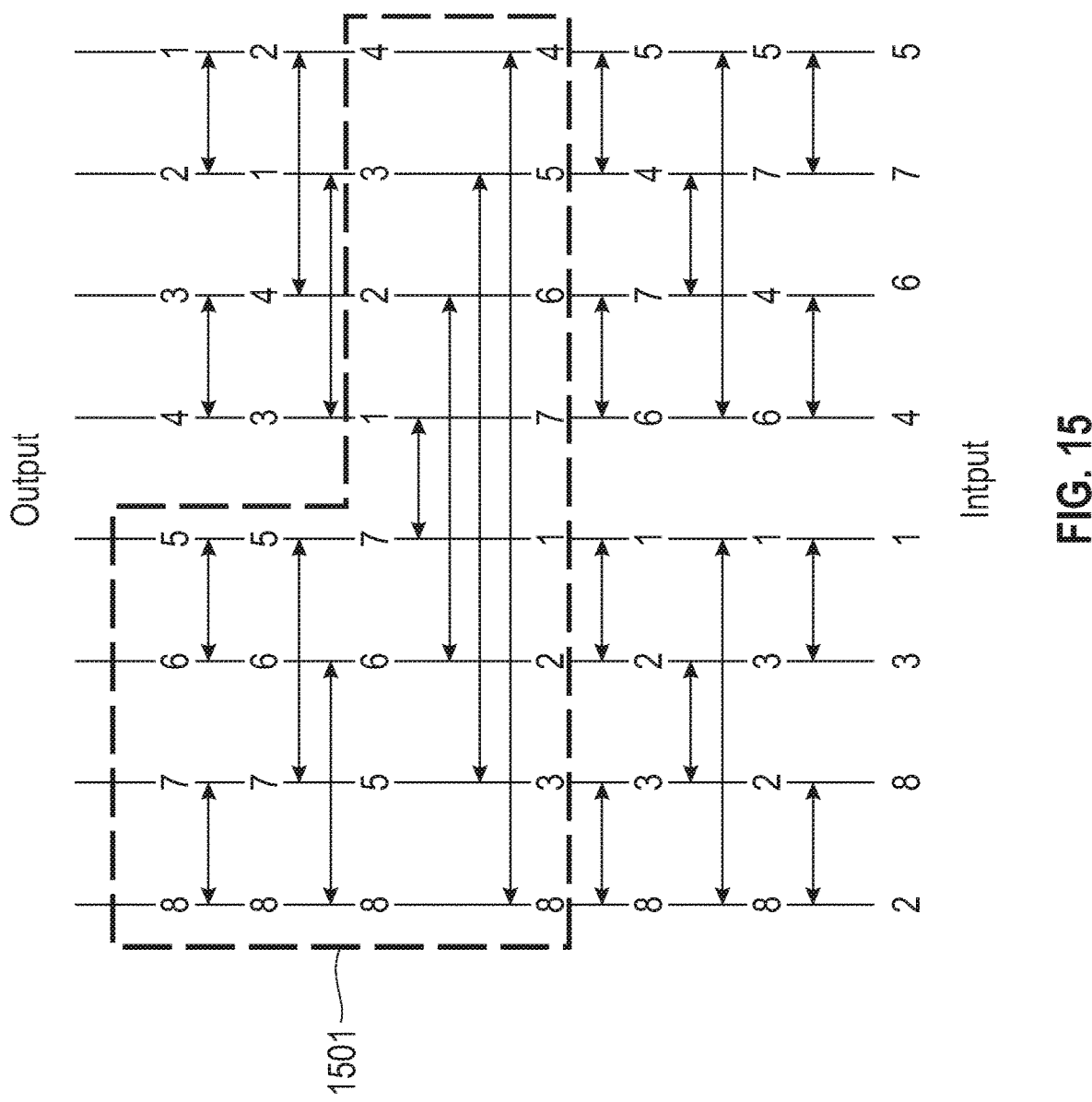
FIG. 15 illustrates exemplary operation of the system of FIG. 14 according to embodiments of the present disclosure.

Referring to FIG. 14, a K-way sorter unit is illustrated according to embodiments of the present disclosure. In this example, the K-way sorter receives K elements in arbitrary order and output k sorted element. It will be appreciated that a variety of network sorters known in the art are suitable for use as set out herein. In this example, an 8-way bitonic sorter is shown, where a bidirectional array compares two items and swaps them if the right item is larger than the left. Exemplary values and swaps are illustrated in FIG. 15, with input at bottom and output at top.

Figure 16:
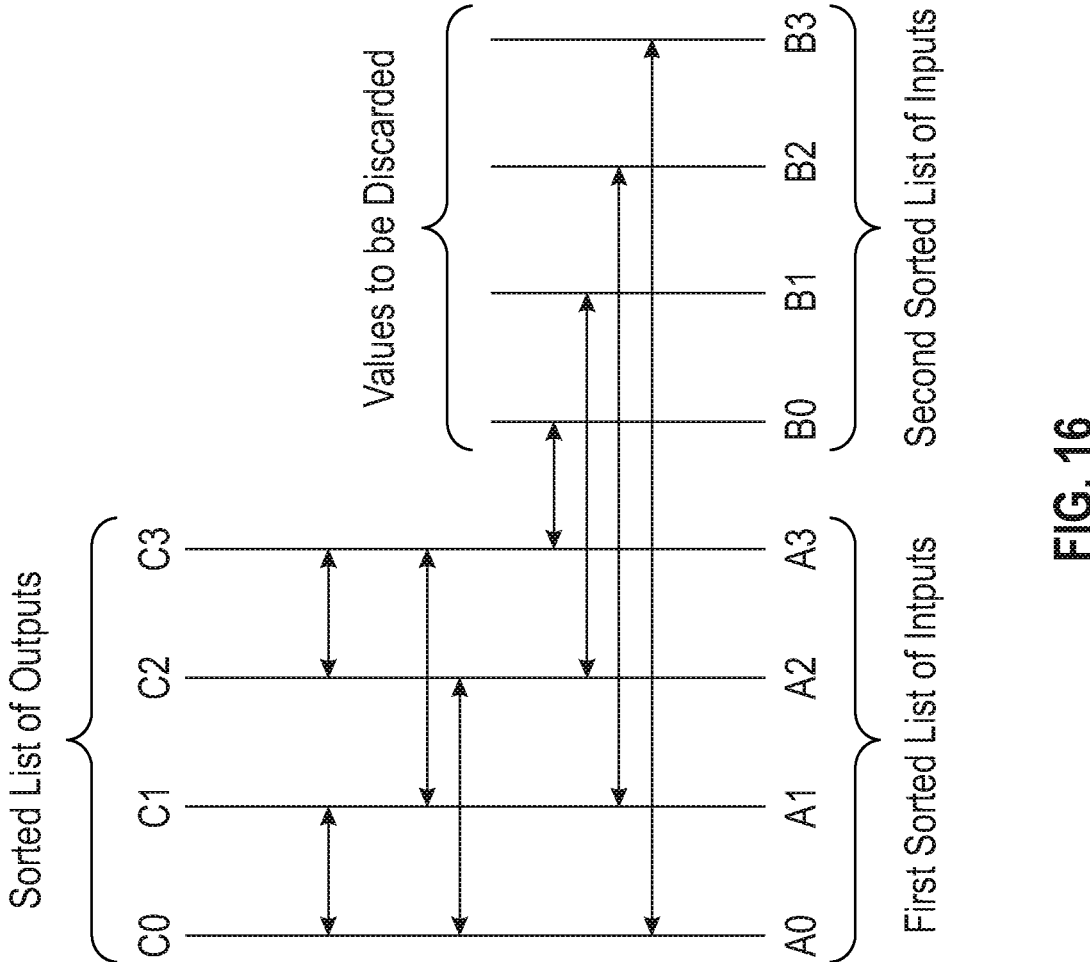
FIG. 16 illustrates a K-way merger unit according to embodiments of the present disclosure.
Figure 17:
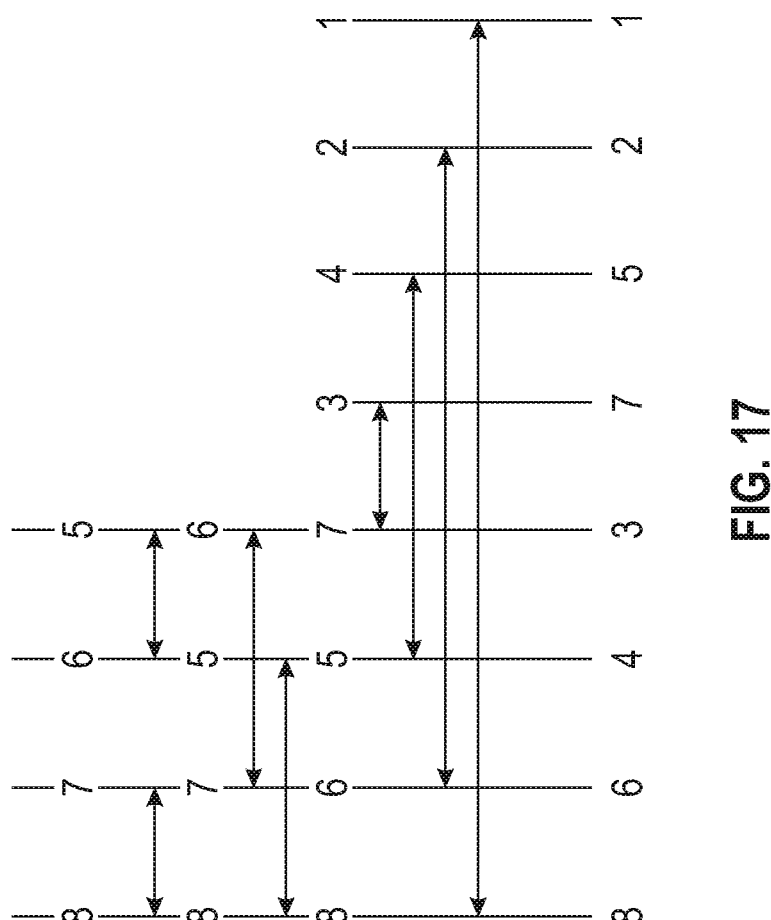
FIG. 17 illustrates exemplary operation of the system of FIG. 16 according to embodiments of the present disclosure.

Referring to FIG. 16, a K-way merger unit is illustrated according to embodiments of the present disclosure. In this example, the K-way merger receives two sorted lists of K elements, and produces a sorted list of the largest K elements from the inputs. Such a merger is constructed in various embodiments by carving unused part out of a bitomic sorter. In FIG. 15, the area 1501 surrounded by the dashed line is identical to the merger unit in FIG. 16. Exemplary values and swaps are illustrated in FIG. 17, with input at bottom and output at top.

Figure 18:
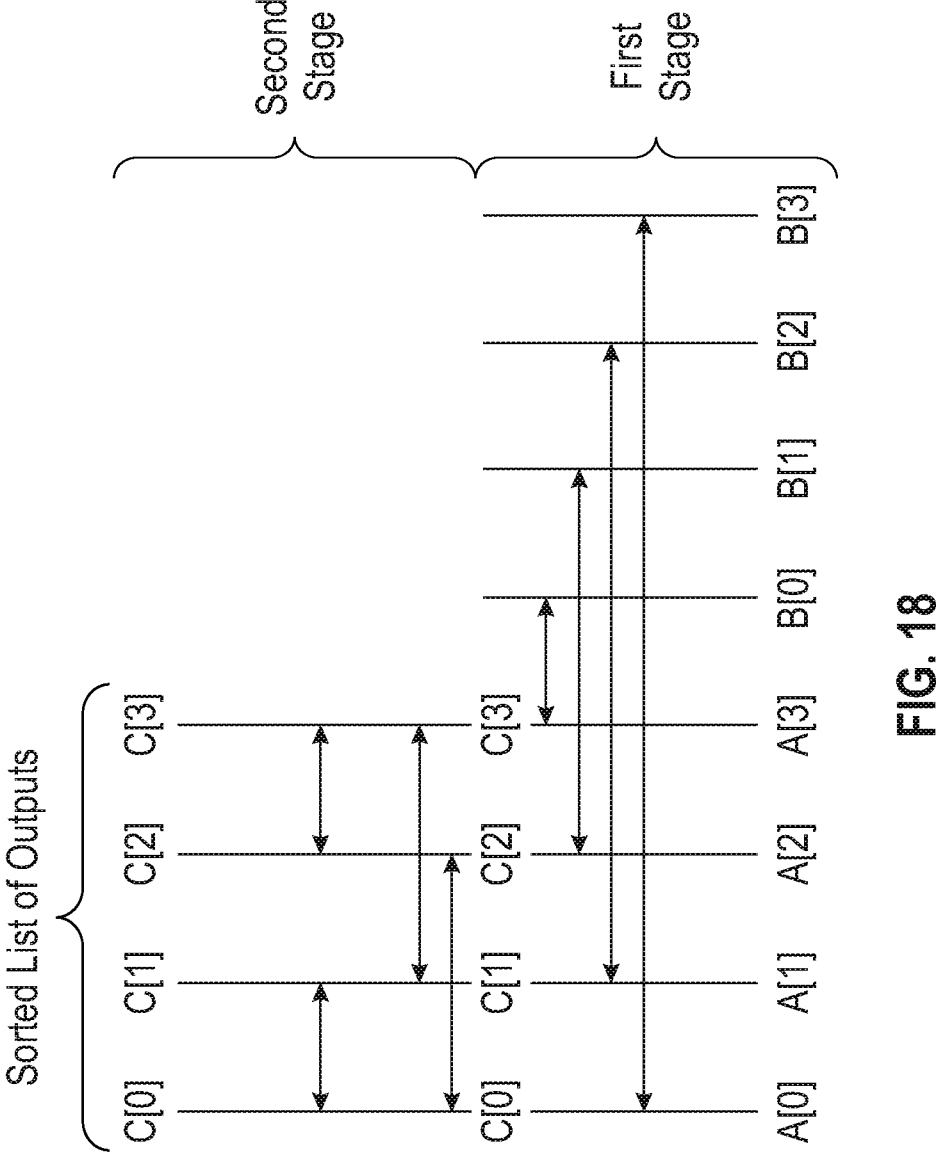
FIG. 18 illustrates a general construction for a k-way Merger according to embodiments of the present disclosure.

Referring to FIG. 18, a general construction for a k-way Merger is illustrated. In this examples, two lists of inputs are assumed: A[i] and B[i] for 0<=i<K. The first stage reduces two sorted list of k-elements to a single bitomic list of k-elements as set out in Inset 1.

---

Inset 1

---

```
For(i = 0 ; i < K; i ++){
    C[i] = max(A[i],B[K–i–1]);
}
```

---

The second stage will swap elements with $2^n$ intervals as set out in Inset 2.

---

Inset 2

---

```
For (n = log2(K)–1;n>=0; n--){
    For(j = 0 ; j < K; j = j + 2^{n+1}){
        For(i = 0 ; i < 2^n; i++){
            If(C[i+j] < C[i+j+2^n])
                Swap(C[i+j], C[i+j+2^n]);
        }
    }
}
```

---

Referring to FIG. 19, a method of using a K-way merger tree to get the top k elements is illustrated. At 1901, a data memory is initialized with scores, and the champion registers are initialized with the minimal values. At 1902, a memory controller reads the next set of multiple scores from a data memory. At 1903, an array of k-way sorters and the k-way merger tree produces the top-K values from the multiple scores read from the data memory. At 1904, the champion merger unit outputs the largest k elements from the k-way merger tree and the champion register. At 1905, the champion register value is replaced with the k element output from the champion k-way merger. At 1906, the k element values are read from the champion register.

As set out above, iterative operation of the K-way merger tree is provided. This may be understood as a K-way merger tree version of the top-K machine configured to generate the top K elements at once. To access more than the top K elements, one can perform multiple top-K operations, to get more than K top elements. After determining the top K elements, the top K elements may be removed, and the same operation performed again. By running the procedure twice, the top K*2 elements may be determined; by running three times, the K*3 top elements can be determined; and so on.

Figure 20:
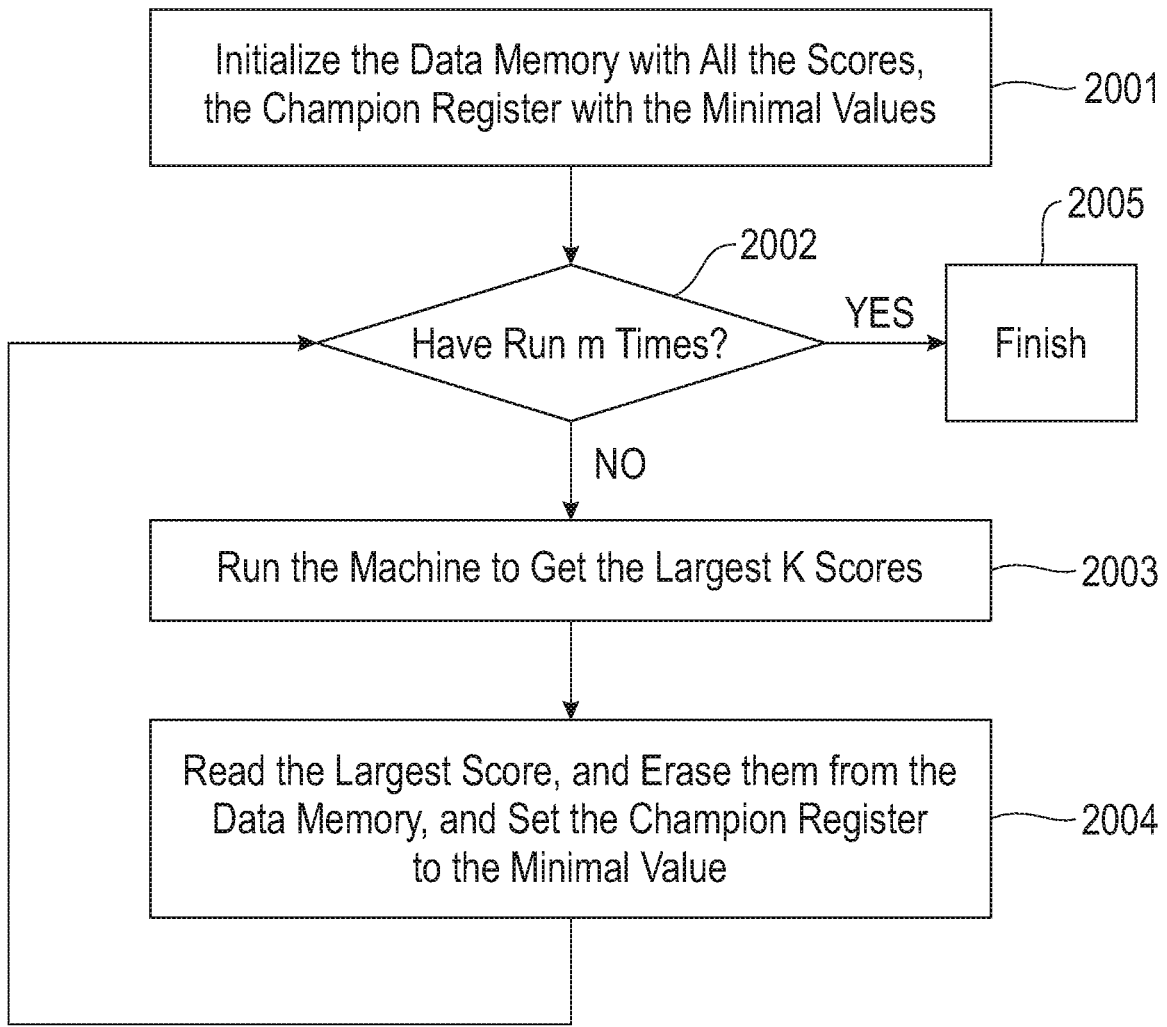
FIG. 20 illustrates a method to determine a top k*m scores with a k-way merger tree according to embodiments of the present disclosure.

Referring to FIG. 20, a method to determine a top k*m scores with a k-way merger tree is illustrated according to the present disclosure. At 2001, the data memory is initialized with all the scores, and the champion register is initialized with the minimal values. At 2002, a run count is checked. The process has run m times, the process concludes at 2005. If not, at 2003, the machine is run to get the largest k scores. At 2004, the largest score is read and erased from the data memory, and the champion register is set to the minimal value.

Figure 21:
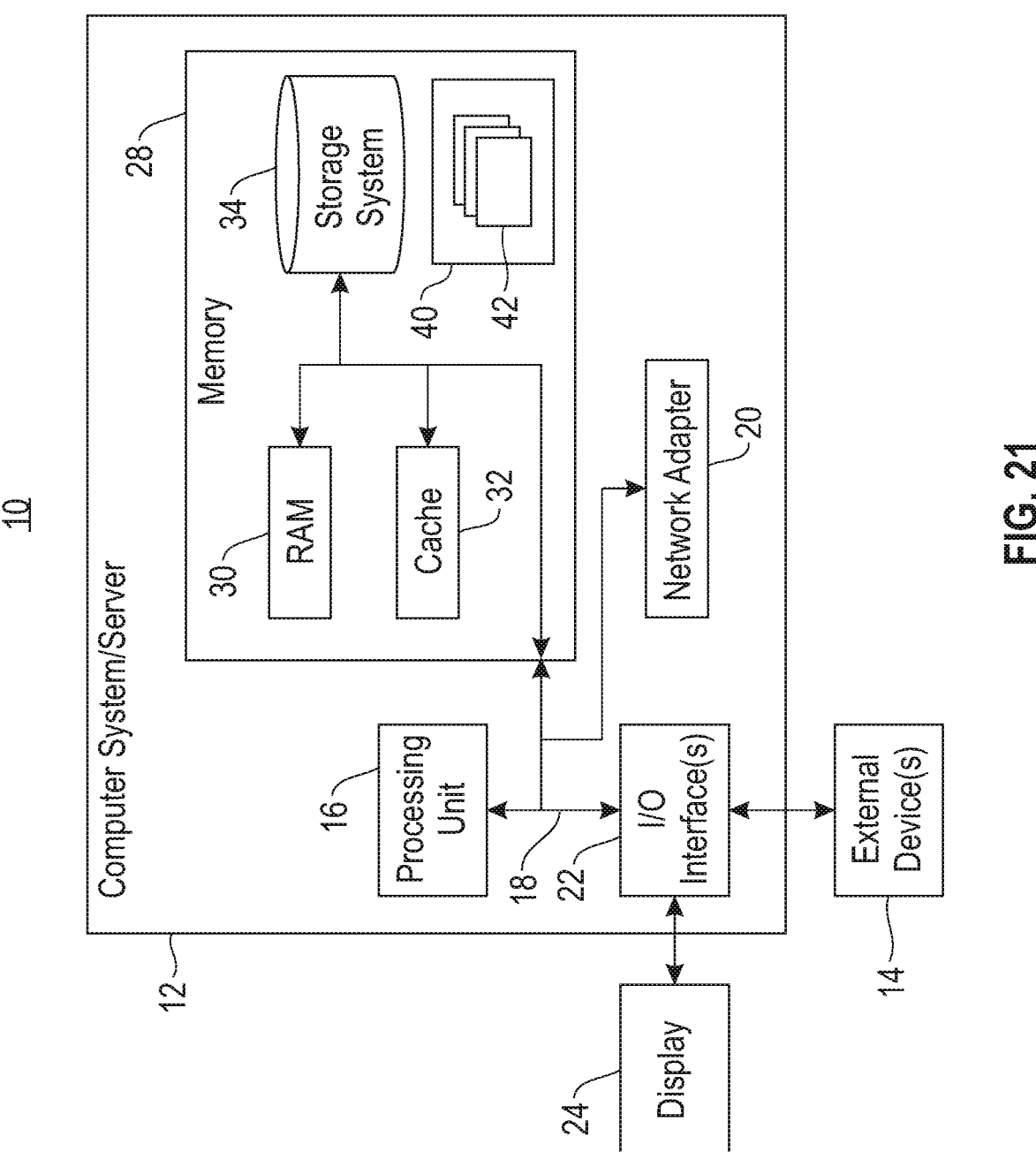
FIG. 21 depicts a computing node according to an embodiment of the present disclosure.

Referring now to FIG. 21, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 21, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
at least one neural core;
a data memory;
a memory controller configured to access the data memory;
an electronic circuit comprising:
a plurality of comparators configured in a comparator tree, the comparator tree having a root node,
    a register, and
    a two-way comparator operatively connected to the root node and to the register, wherein an output of the register is coupled to a first input of the two-way comparator, wherein an output of the two-way comparator is connected to an input of the register, and wherein an output of the root node is connected to a second input of the two-way comparator, and wherein the at least one neural core is configured to generate a first plurality of values, each value of the first plurality of values having a corresponding output neuron of an artificial neural network, wherein the data memory is configured to receive the first plurality of values from the at least one neural core, wherein the memory controller is configured to provide the first plurality of values from the data memory to the comparator tree, wherein the comparator tree is configured to perform a plurality of concurrent pairwise comparisons of the first plurality of values to arrive at a greatest value of the first plurality of values, wherein the two-way comparator is configured to:
    receive, at the first input of the two-way comparator, a stored maximum value of the register,
    receive, at the second input of the two-way comparator, the greatest value from the comparator tree, and
    provide, at the output of the two-way comparator, a maximum value out of the stored maximum value and the greatest value, and wherein the register is configured to store the maximum value provided from the output of the two-way comparator, and an identification of the output neuron corresponding with the maximum value, thereby replacing the stored maximum value.

2. The system of claim 1, wherein the memory controller is further configured to provide a second plurality of values from the data memory to the comparator tree.

3. The system of claim 2, wherein the memory controller is further configured to determine the second plurality of values by removing the greatest value from the first plurality of values.

4. The system of claim 1, wherein the comparator tree is configured to perform the plurality of concurrent pairwise comparisons in a pipelined configuration.

5. The system of claim 1, further comprising:
an additional comparator tree, configured to operate in parallel to the comparator tree.

6. A system comprising:
at least one neural core;
a data memory;
a memory controller configured to access the data memory;
a plurality of k-way sorters, wherein k is greater than two;
an electronic circuit comprising:
    a plurality of first k-way mergers configured in a merger tree, the merger tree having a root node,
    a register, and
    a second k-way merger operatively connected to the root node and to the register, wherein an output of the register is coupled to a first input of the second k-way merger, wherein an output of the second k-way merger is connected to an input of the register, and wherein an output of the root node is connected to a second input of the second k-way merger, and
wherein the at least one neural core is configured to generate a first plurality of values, each value of the first plurality of values having a corresponding output neuron of an artificial neural network, wherein the data memory is configured to receive the first plurality of values from the at least one neural core, wherein the memory controller is configured to provide the first plurality of values from the data memory to the plurality of k-way sorters, wherein the plurality of k-way sorters is configured to provide sorted output of the first plurality of values to the merger tree, wherein the merger tree is configured to perform a plurality of concurrent mergers of the first plurality of values to arrive at a set of greatest values of the first plurality of values, wherein the second k-way merger is configured to:
    receive, at the first input of the second k-way merger, stored k maximum values of the register,
    receive, at the second input of the second k-way merger, a greatest k values of the set of greatest values from the merger tree, and
    provide, at the output of the second k-way merger, k maximum values out of the stored k maximum values and the greatest k values of the set of greatest values, and
wherein the register is configured to store the k maximum values provided from the output of the second k-way merger, and an identification of the output neuron corresponding with each of the k maximum values, thereby replacing the stored k maximum values.

7. The system of claim 6, wherein: the memory controller is further configured to provide a second plurality of values from the data memory to the plurality of k-way sorters.

8. The system of claim 7, wherein the memory controller is further configured to determine the second plurality of values by removing the set of greatest values from the first plurality of values.

9. The system of claim 6, wherein the merger tree is configured to perform the plurality of concurrent mergers in a pipelined configuration.

10. The system of claim 6, further comprising:
an additional merger tree, configured to operate in parallel to the merger tree.

11. A method comprising:
generating, by at least one neural core, a first plurality of values, wherein each value of the first plurality of values having a corresponding output neuron of an artificial neural network;
receiving, at a data memory, the first plurality of values from the at least one neural core;
providing the first plurality of values from the data memory to a comparator tree of an electronic circuit, wherein the electronic circuit comprises:
    a plurality of comparators configured in the comparator tree, the comparator tree having a root node,
    a register, and
    a two-way comparator operatively connected to the root node and to the register, wherein an output of the register is coupled to a first input of the two-way comparator, wherein an output of the two-way comparator is connected to an input of the register, and wherein an output of the root node is connected to a second input of the two-way comparator;
performing, by the comparator tree, a plurality of concurrent pairwise comparisons of the first plurality of values to arrive at a greatest value of the first plurality of values;
receiving, at the first input of the two-way comparator, a stored maximum value of the register,
receiving, at the second input of the two-way comparator, the greatest value from the comparator tree;
providing, at the output of the two-way comparator, a maximum value out of the stored maximum value and the greatest value; and
storing, by the register, the maximum value provided from the output of the two-way comparator, and an identification of the output neuron corresponding with the maximum value, thereby replacing the stored maximum value.

12. The method of claim 11, further comprising:
providing a second plurality of values from the data memory to the comparator tree.

13. The method of claim 12, further comprising:
determining the second plurality of values by removing the greatest value from the first plurality of values.

14. The method of claim 11, wherein the comparator tree is configured to perform the plurality of concurrent pairwise comparisons in a pipelined configuration.

15. The method of claim 11, further comprising operating an additional comparator tree in parallel to the comparator tree.

16. A method comprising:
generating, by at least one neural core, a first plurality of values, wherein each value of the first plurality of values having a corresponding output neuron of an artificial neural network;
receiving, at a data memory, the first plurality of values from the at least one neural core;
providing the first plurality of values from the data memory to a plurality of k-way sorters, wherein k is greater than two;
providing sorted output of the plurality of k-way sorters to a merger tree of an electronic circuit, wherein the electronic circuit comprises:
    a plurality of first k-way mergers configured in the merger tree, the merger tree having a root node,
    a register, and
    a second k-way merger operatively connected to the root node and to the register, wherein an output of the register is coupled to a first input of the second k-way merger, wherein an output of the second k-way merger is connected to an input of the register, and wherein an output of the root node is connected to a second input of the second k-way merger;
performing, by the merger tree, a plurality of concurrent mergers of the first plurality of values to arrive at a set of greatest values of the first plurality of values;
receiving, at the first input of the second k-way merger, stored k maximum values of the register;
receiving, at the second input of the second k-way merger, greatest k values of the set of greatest values from the merger tree;
providing, at the output of the second k-way merger, k maximum values out of the stored k maximum values and the greatest k values of the set of greatest values; and
storing, by the register, the k maximum values provided from the output of the second k-way merger, and an identification of the output neuron corresponding with each of the k maximum values, thereby replacing the stored k maximum values.

17. The method of claim 16, further comprising:
providing a second plurality of values from the data memory to the plurality of k-way sorters.

18. The method of claim 17, further comprising:
determining the second plurality of values by removing the set of greatest values from the first plurality of values.

19. The method of claim 16, wherein the merger tree is configured to perform the plurality of concurrent mergers in a pipelined configuration.

20. The method of claim 16, further comprising operating an additional merger tree in parallel to the merger tree.

\* \* \* \* \*